United States Patent
Agrawal et al.

(10) Patent No.: US 11,021,676 B2
(45) Date of Patent: Jun. 1, 2021

(54) COATING COMPOSITIONS FOR ORIENTED STRAND BOARDS AND ASSOCIATED METHODS OF USE

(71) Applicant: ExxonMobil Research and Engineering Company, Annandale, NJ (US)

(72) Inventors: Sarvesh K. Agrawal, Woolwich Township, NJ (US); Joseph P. Rud, Oakton, VA (US); Larry E. Hoch, Yardley, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 45 days.

(21) Appl. No.: 15/432,181

(22) Filed: Feb. 14, 2017

(65) Prior Publication Data

US 2017/0247573 A1    Aug. 31, 2017

Related U.S. Application Data

(60) Provisional application No. 62/300,120, filed on Feb. 26, 2016.

(51) Int. Cl.
*C11C 5/00* (2006.01)
*F23D 3/16* (2006.01)
(Continued)

(52) U.S. Cl.
CPC .............. *C11C 5/002* (2013.01); *B27N 7/005* (2013.01); *C09D 191/06* (2013.01);
(Continued)

(58) Field of Classification Search
None
See application file for complete search history.

(56) References Cited

U.S. PATENT DOCUMENTS 2,662,029 A * 12/1953 Mathes ................... C08L 91/08
106/270
4,118,203 A    10/1978 Beardmore et al.
(Continued)

FOREIGN PATENT DOCUMENTS

| CA | 2431792 A1 | 6/2003 |
| CN | 1182783 A | 5/1998 |

(Continued)

OTHER PUBLICATIONS

JP 62-079266 A (Yamane et al) (published Apr. 11, 1987) (full English translation) (Year: 1987).*

(Continued)

*Primary Examiner* — Vivian Chen
(74) *Attorney, Agent, or Firm* — Scott F. Yarnell

(57) ABSTRACT

Wax compositions are provided with improved properties for various applications, such as coating of composite cellulosic materials, e.g., composite wood material, more specifically oriented strand board. As described herein, wax compositions include a kinematic viscosity measured at 100° C. of ≤13.1 mm²/s; and a contact angle on glass of ≤34.4°, which provide enhanced water proofing properties. The wax composition may have a flash point of greater than 450° F. Wax composition are provided with improved properties for candle jars. As described herein, candle jar wax compositions include 150N foots oil and 600N slack wax. The wax composition can include up to about 80% 150N foots oil.

19 Claims, 2 Drawing Sheets

(51) Int. Cl.
  *B27N 7/00*     (2006.01)
  *C09D 191/06*   (2006.01)
  *C09D 191/08*   (2006.01)
  *C09D 191/00*   (2006.01)

(52) U.S. Cl.
  CPC ............ *C09D 191/08* (2013.01); *C11C 5/004* (2013.01); *F23D 3/16* (2013.01); *B27N 7/00* (2013.01); *C09D 191/00* (2013.01); *C10M 2205/16* (2013.01); *Y10T 428/31801* (2015.04); *Y10T 428/31804* (2015.04); *Y10T 428/31808* (2015.04)

(56) References Cited

U.S. PATENT DOCUMENTS

| | | | |
|---|---|---|---|
| 4,127,683 A * | 11/1978 | Flemmer | B65B 23/20 427/287 |
| 4,331,446 A * | 5/1982 | Draper | C10L 5/16 44/544 |
| 4,855,098 A | 8/1989 | Taylor | |
| 4,965,305 A * | 10/1990 | Jones | C08L 91/08 524/349 |
| 5,108,964 A * | 4/1992 | Corbett | B22F 3/225 264/109 |
| 5,578,089 A | 11/1996 | Elsamaloty | |
| 5,603,071 A * | 2/1997 | Kitagawa | B22F 3/1021 264/645 |
| 5,685,758 A * | 11/1997 | Paul | A61L 15/48 428/355 EN |
| 5,879,694 A | 3/1999 | Morrison et al. | |
| 6,001,286 A | 12/1999 | Sleeter | |
| 6,019,804 A | 2/2000 | Requejo et al. | |
| 6,063,144 A | 5/2000 | Calzada et al. | |
| 6,096,102 A | 8/2000 | Matthai et al. | |
| 6,159,254 A | 12/2000 | Akiyama et al. | |
| 6,183,849 B1 | 2/2001 | Lindsay et al. | |
| 6,214,918 B1 | 4/2001 | Johnson et al. | |
| 6,221,115 B1 | 4/2001 | Hyun et al. | |
| 6,262,153 B1 | 7/2001 | Webster et al. | |
| 6,277,310 B1 | 8/2001 | Sleeter | |
| 6,284,007 B1 | 9/2001 | Tao | |
| 6,296,674 B1 | 10/2001 | Trainor et al. | |
| 6,440,184 B2 | 8/2002 | Noda et al. | |
| 6,471,731 B1 | 10/2002 | Elliott, III et al. | |
| 6,497,735 B2 | 12/2002 | Tao | |
| 6,503,285 B1 | 1/2003 | Murphy | |
| 6,540,795 B2 | 4/2003 | Wood et al. | |
| 6,544,304 B2 | 4/2003 | Wood et al. | |
| 6,544,305 B2 | 4/2003 | Wood et al. | |
| 6,547,840 B2 | 4/2003 | Wood et al. | |
| 6,562,083 B2 | 5/2003 | Wood et al. | |
| 6,562,084 B2 | 5/2003 | Wood et al. | |
| 6,562,085 B1 | 5/2003 | Wood et al. | |
| 6,599,334 B1 | 7/2003 | Anderson | |
| 6,656,235 B2 | 12/2003 | An | |
| 6,667,403 B2 | 12/2003 | Wood et al. | |
| 6,740,132 B2 | 5/2004 | Wood et al. | |
| 6,770,104 B2 | 8/2004 | Murphy | |
| 6,773,469 B2 | 8/2004 | Murphy | |
| 6,797,020 B2 | 9/2004 | Murphy | |
| 6,830,614 B2 | 12/2004 | Hudson et al. | |
| 6,905,525 B2 | 6/2005 | Wood et al. | |
| 7,018,432 B2 | 3/2006 | Moussouni | |
| 7,220,288 B2 | 5/2007 | D'Amico et al. | |
| 7,445,648 B2 | 11/2008 | Hudson et al. | |
| 7,462,205 B2 | 12/2008 | Murphy | |
| 7,588,607 B1 | 9/2009 | Cap | |
| 7,637,968 B2 | 12/2009 | Murphy | |
| 7,731,767 B2 | 6/2010 | Tao | |
| 7,846,372 B1 | 12/2010 | Njus et al. | |
| 8,071,209 B2 | 12/2011 | Theberge et al. | |
| 8,076,006 B2 | 12/2011 | Wantling | |
| 8,231,763 B2 * | 7/2012 | Buchholz | B27N 1/006 106/14.26 |
| 8,343,634 B2 | 1/2013 | Wantling et al. | |
| 8,476,345 B2 | 7/2013 | Buchholz | |
| 8,652,633 B2 | 2/2014 | Buchholz | |
| 8,748,516 B2 | 6/2014 | Winterowd et al. | |
| 9,243,162 B1 * | 1/2016 | Agrawal | C09D 191/08 |
| 10,745,587 B1 * | 8/2020 | Jarnagin | C09D 191/06 |
| 2002/0161085 A1 * | 10/2002 | Gibes | A61L 15/58 524/318 |
| 2003/0046860 A1 | 3/2003 | Tiffany et al. | |
| 2003/0091949 A1 | 5/2003 | Pesu et al. | |
| 2003/0110683 A1 | 6/2003 | Murphy | |
| 2003/0148239 A1 | 8/2003 | Szczerba et al. | |
| 2004/0088908 A1 | 5/2004 | Murphy | |
| 2004/0139885 A1 * | 7/2004 | Hudson | C09D 191/08 106/270 |
| 2004/0221504 A1 | 11/2004 | Murphy | |
| 2005/0060927 A1 | 3/2005 | Murphy | |
| 2007/0006522 A1 | 1/2007 | Tao | |
| 2007/0026352 A1 | 2/2007 | Kubicek et al. | |
| 2007/0094916 A1 | 5/2007 | Burkhamer et al. | |
| 2007/0094917 A1 * | 5/2007 | Burkhamer | A23D 9/00 44/275 |
| 2007/0256352 A1 | 11/2007 | Wood et al. | |
| 2007/0282000 A1 | 12/2007 | Murphy et al. | |
| 2008/0145808 A1 | 6/2008 | Lee | |
| 2009/0217568 A1 | 9/2009 | Murphy et al. | |
| 2010/0205851 A1 | 8/2010 | Uptain et al. | |
| 2010/0215928 A1 * | 8/2010 | Murayama | B32B 33/00 428/212 |
| 2010/0299989 A1 | 12/2010 | Tao et al. | |
| 2011/0082323 A1 * | 4/2011 | Small | B01J 21/12 585/18 |
| 2012/0245232 A1 * | 9/2012 | Bousque | A01N 61/02 514/763 |
| 2014/0212607 A1 * | 7/2014 | Addcox | A61F 13/51462 428/34.8 |
| 2015/0203719 A1 * | 7/2015 | Fu | C09D 191/08 428/34.1 |
| 2016/0122588 A1 * | 5/2016 | Agrawal | C09D 191/06 428/174 |
| 2016/0222251 A1 * | 8/2016 | Agrawal | C08J 7/047 |

FOREIGN PATENT DOCUMENTS

| | | |
|---|---|---|
| CN | 1478876 A | 3/2004 |
| CN | 200971351 Y | 11/2007 |
| CN | 101463290 A | 6/2009 |
| DE | 19644737 A1 | 7/1997 |
| DE | 10035481 A1 | 4/2001 |
| DE | 102008044107 A1 | 6/2010 |
| EP | 1252227 B1 | 9/2004 |
| EP | 1616935 A | 1/2006 |
| EP | 1776868 A1 | 4/2007 |
| EP | 1776869 A1 | 4/2007 |
| EP | 1390460 B1 | 8/2010 |
| FR | 2686894 A | 7/1993 |
| FR | 2847261 B1 | 5/2004 |
| GB | 2429017 A | 9/2006 |
| JP | 62-079266 A * | 4/1987 |
| JP | 2002212590 A | 7/2002 |
| WO | 9924233 A1 | 5/1999 |
| WO | 0060012 A1 | 10/2000 |
| WO | 0119609 A1 | 3/2001 |
| WO | 0157125 A1 | 8/2001 |
| WO | 0157126 A1 | 8/2001 |
| WO | 02079313 A1 | 10/2002 |
| WO | 02079314 A1 | 10/2002 |
| WO | 02092736 A1 | 11/2002 |
| WO | 02098968 A1 | 12/2002 |
| WO | 2004015045 A2 | 2/2004 |
| WO | 2004046286 A1 | 6/2004 |
| WO | 2005042682 A1 | 5/2005 |
| WO | 2006076364 A3 | 7/2006 |
| WO | 2008151064 A1 | 12/2008 |
| WO | 2008157436 A1 | 12/2008 |
| WO | 2009128069 A1 | 10/2009 |

(56) References Cited

FOREIGN PATENT DOCUMENTS

| WO | 2016032702 A1 | 3/2016 |
|----|---------------|--------|
| WO | 2016111865 A1 | 7/2016 |
| WO | 2016144761 A1 | 9/2016 |

OTHER PUBLICATIONS

"Hase—Paraffin Wax" (https://web.archive.org/web/20160123185323/https://www.hpwax.com/paraffin_wax.htm) (webpage archived Jan. 23, 2016) (archived webpage retrieved Dec. 10, 2019) (Year: 2016).*

"TDM—Fully Refined Paraffin Wax" (http://iranparaffinwax.com/paraffin-wax/fully-refined-paraffin-wax-0-75%D9%AA-oil-content.html) (webpage retrieved Dec. 10, 2019) (2010) (Year: 2010).*

"TDM—Slack Wax Light Grade" (http://iranparaffinwax.com/slack-wax/slack-wax-light-grade.html) (webpage retrieved Dec. 10, 2019) (2010) (Year: 2010).*

Carll, Review of Thickness Swell in Hardboard Siding-Effect of Processing Variables, Gen. Tech. Rep. FPL-GTR-96, Jan. 1997, U.S. Department of Agriculture, Forest Service, Forest Products Laboratory, Madison, WI.

Hsu, et al. Water Repellent Efficacy of Wax Used in Hardboard, Ind. Eng. Chem. Res., vol. 27, No. 7, 1988, American Chemical Society, Philadelphia, PA.

Maloney, Structural materials, binders and other additives, and special considerations, Seventeenth International Particleboard/Composite Materials Series Symposium held at Washington State University, Letters to the Editor, Wood Sci. Technol. 18:157-160, Springer-Verlag 1984, Berlin, Germany.

Meyer, Interactions between Chain Length Distributions, Crystallization behaviour and Needle Penetration of Paraffin Waxes, Erdol-Erdgas-Kohle-Journal, Jan. 2006, Hamburg, Germany.

Roffael, For waterproofing medium density fiberboard with paraffins part 1: influence of the chemical composition of the paraffin and the type of emulsifier on the waterproofing of MDF, Wood as raw materials and composites, Apr. 2005, 63, Springer-Verlag, Berlin, Germany.

Roffael, Paraffin Sizing of Particleboards: Chemical Aspects, Proceedings of the Seventeenth Washington State University International Particleboard/Composite Materials Series, Mar. 1983, Pullman, Washington.

Young, Practical Applications of Gas Chromatography in the Paint and Coatings Industry, Analysis of Paints and Related Materials; Current Techniques for Solving Coating Problems, ASTM STP 1119, American Society for Testing and Materials, 1992, Philadelphia, Pennsylvania.

The International Search Report and Written Opinion of PCT/US2017/017784 dated May 11, 2017.

* cited by examiner

COATING COMPOSITIONS FOR ORIENTED STRAND BOARDS AND ASSOCIATED METHODS OF USE

CROSS-REFERENCE TO RELATED APPLICATIONS

This application claims priority to U.S. Provisional Application Ser. No. 62/300,120 filed Feb. 26, 2016, which is herein incorporated by reference in its entirety.

FIELD

The present disclosure relates to systems and methods for forming a wax coating composition, e.g., for use with composite cellulosic materials, e.g., composite board materials. Additionally, the present disclosure relates to wax formulations for use in, e.g., candle formations.

BACKGROUND

The use of wax to provide water repellency in composite board products such as, e.g., oriented strand board (OSB), particleboard, medium density fiberboard (MDF), and construction boards, etc., is a fast growing application of wax because of growth in the composite board industry. Wax is added to these manufactured wood products to provide adequate water repellency because such cellulose based wood products easily wick in moisture, which can lead to poor dimensional stability of these products. Therefore, wax coating compositions on cellulosic products provide rigidity and strength, as well as a barrier to moisture, water, oil and grease that ultimately protects the mechanical integrity of the material.

Previous studies on optimum wax compositions for water proofing of composite boards, and specifically OSB, points to n-paraffin content of waxes as the main compositional parameter affecting water repellency irrespective of oil content. However, the art is rife with conflicting information regarding the effect of wax compositional variables on their waterproofing performance in composite boards.

It is well-known in the art that a narrow molecular weight distribution of paraffin molecules is beneficial for several key properties, including, inter alia, improved water-proofing, hardness, and oil bleed, among others. For example, wax with a wide carbon number distribution is known to be detrimental to the quality of the wax and causes "oil bleed" (Young, F. X. "Practical Applications of Gas Chromatography in Paints and Coatings Industry," Analysis of Paints and Related Materials: Current Techniques for Solving Coating Problems, American Society for Testing and Materials (ASTM), Philadelphia, 1992, ASTM STP 1119, p 105-124). Oil bleed is the tendency of a wax to have a slick-oily surface and is related to poor wax quality and poor water proofing. Oil bleed in a coating product may provide poor surface characteristics to the coating in terms of poor appearance and lower friction coefficient of the slick coated surface. Similarly, a narrow distribution of carbon lengths and a narrow distillation cut is necessary for production of a high quality wax having sufficient hardness, especially at higher temperatures (Meyer, G. "Interactions between chain length distributions, crystallization behavior and needle penetration of paraffin waxes," Erdol-Erdgas-Kohle Journal, 2006, 122.Jb, 1, S.16-18). Finally, the literature has described how increasing molecular weight distribution leads to a decrease in crystal perfection of crystalline materials, which in turn is directly responsible for reduction in barrier properties and water proofing of the material.

For the same reasons, high n-paraffin content is desired in waxes that are used in water proofing applications. High n-paraffin content tends to give a higher percentage of crystalline phase in the material, which in turn is responsible for good barrier properties of the material among other desirable characteristics.

Competing with the ongoing need for paraffin wax materials, including those suitable for use in coating cellulosic materials and composite boards, is the fact that the wax obtained from the Group I refining process, which includes high-quality paraffin waxes, are declining (especially the mid and low carbon numbers), because these wax stocks are more and more frequently consumed for the production of lubricants. Moreover, lower quality paraffin waxes are also recycled and further processed for further lubricant production. Therefore, rationalization of Group I refining assets is reducing the supply of wax. With a reduction in available sources of wax, it has become ever more important to have the flexibility of blending different wax streams without a concomitant deterioration in product properties. However, blending of wax streams with widely different molecular weights or widely different average carbon numbers is well-known to have a negative effect on product properties.

As such, there exists in the art a need for the wax materials that demonstrate properties suitable for industrial use, e.g., coatings for cellulosic materials, OSB, etc. but that can be produced with lower cost waxes and the flexibility to formulate an optimized wax product for use as a composite board coating with a variety of available wax streams. With the rationalization of Group 1 refining capacity around the world and sharply declining availability of high quality wax streams, a flexibility to use different wax streams to make a suitable product provides a significant advantage.

Evaluation of candle waxes require a qualitative and quantitative assessment. Candle appearance is the primary quality an end-user customer employs in the purchase of a finished candle product. As such, candles should have either a uniform smooth or non-smooth finish with no oil bleed on the candle surface. In particular for jar candles, candle manufacturers evaluate whether a candle wax blend properly adheres to the sides of the glass jar and without frosting or cracking the surface of the wax. A quantitative evaluation of burn performance is conducted by candle manufacturers where minimal sooting and reasonable wax consumption are desired. Melt pool formation (i.e., time to form full melt pool), melt pool depth, and flame height may be assessed as well, where the ideal ratio of flame height to melt pool should be 1.

As discussed above, Group I refineries are being converted to Group II and Group III refineries, which has resulting in a decreased in wax sources for candle jar wax. As such, there exists a need to find other suitable wax sources for candle jar was formulations.

SUMMARY

Presently described are wax compositions and methods for making and using the same to improve the characteristics of cellulosic materials, e.g., composite board materials. Suitable blends of waxes or individual wax streams that are individually not suitable or not optimized for composite wood coatings can be identified using the optimum wax composition envelope discovered in this disclosure, thereby allowing for use of such wax streams in the application and increasing the value of scantily available wax molecules. It was surprisingly and unexpectedly discovered that optimized wax compositions suitable for use in these applications depend on at least one of the kinematic viscosity, contact angle on glass or both. It was observed that the waxes with the physical characteristics described herein have enhanced coating ability and provide superior or equivalent water absorption repellency as current wax compositions used in composite board applications.

In particular, the description provides wax compositions useful to make coatings for composite cellulosic materials or wood, e.g., oriented strand board, which have improved coating ability and water proofing characteristics. Specifically, the description provides a unique set of wax compositional parameter specifications that surprisingly provide improved properties for use of the wax blend composition in coatings for composite cellulosic materials or wood, more specifically oriented strand board.

Thus, in one aspect, the disclosure provides wax compositions as described herein. In certain embodiments, the wax composition comprises a wax or wax blend having at least one of: a kinematic viscosity measured at 100° C. of less than or equal to about 13.1 mm$^2$/s; a contact angle on glass of less than or equal to about 34.4° or both. In additional embodiments, the wax composition has a flash point of at least about 425° F. In additional embodiments, the wax composition has a flash point of at least about 450° F. In certain embodiments, the wax composition comprises a wax or wax blend having a kinematic viscosity measured at 100° C. of less than or equal to about 13.1 mm$^2$/s, and a contact angle on glass of less than or equal to about 34.4°.

In additional embodiments, the kinematic viscosity is less than or equal to about 12 mm$^2$/s. In certain additional embodiments, the kinematic viscosity is less than or equal to about 10 mm$^2$/s. In certain additional embodiments, the kinematic viscosity is less than or equal to about 7.9 mm$^2$/s. In certain additional embodiments, the kinematic viscosity is less than or equal to about 6.3 mm$^2$/s.

In certain embodiments, the wax composition has a contact angle on glass is less than or equal to about 34.4°. In certain embodiments, the wax composition has a contact angle on glass is less than or equal to about 32°. In certain embodiments, the wax composition has a contact angle on glass is less than or equal to about 30°.

In any of the aspects or embodiments described herein, the resulting wax composition provides a particle board, e.g., OSB, with a water absorption in a 2 hour water soak test, of less than about 20%. In certain embodiments, the water absorption is less than about 15%. In particular embodiments, the water absorption is less than about 13%.

In an additional aspect, the disclosure provides a cellulosic material coated with a wax composition as described herein. In certain embodiments, the cellulosic material is completely saturated or coated with the wax composition. In additional embodiments, the cellulosic material is partially coated. In certain embodiments, the description provides a wax coated cellulosic material or article comprising a cellulosic surface comprising a wax coating of from about 0.1% by weight to about 15% by weight of the cellulosic material or article. In some embodiments, the wax coating is about 0.1% by weight to about 5% by weight of the cellulosic material or article. In a particular embodiment, the wax coating is about 0.1% by weight to about 1% by weight of the cellulosic material or article.

In another aspect, the disclosure provides a composite cellulosic material or wood, e.g., OSB, having a complete or partial wax coating formed from the wax compositions as described herein, wherein the resulting coated composite cellulose material or wood has a water absorption of less than about 20%. In certain embodiments, the resulting coated composite cellulosic material or wood has a water absorption of less than about 15%, or less than about 13%, including all values in between. In certain embodiments, the description provides a wax coated cellulosic article comprising a wax coating of from about 0.1% by weight to about 90% by weight of the cellulosic article.

In an additional aspect, the disclosure provides methods of making the wax compositions as described herein. In certain embodiments, the method includes admixing two or more waxes such that the resulting composition has physical characteristics as described herein, e.g., a kinematic viscosity measured at 100° C. of equal to or less than about 13.1 mm$^2$/s and/or a contact angle on glass of equal to or less than about 34.4°. In certain embodiments, the method includes admixing two or more waxes such that the resulting composition has a kinematic viscosity measured at 100° C. of equal to or less than about 13.1 mm$^2$/s, and a contact angle on glass of equal to or less than about 34.4°.

In still an additional aspect, the disclosure provides methods of using the wax compositions as described herein. In certain embodiments, the disclosure provides a method of forming a wax-coated article or material comprising providing the item and applying a coating of the wax composition as described herein. In certain embodiments, the disclosure provides a method of forming a wax-coated cellulosic composite material comprising providing a cellulosic article or material having a surface, forming or providing a wax composition as described herein and applying the wax composition to the cellulosic article or material. In certain embodiments, the cellulosic material is saturated with the wax composition. In certain additional embodiments, the cellulosic material is partially coated. In certain embodiments the wax is absorbed into the cellulosic material. In certain embodiments, the neat molten wax is sprayed on the cellulosic material to form a partial coating. In certain embodiments, the wax can be emulsified together with water and surfactants in various concentrations and the emulsion can be sprayed or added directly into a slurry prior to board formation. In any of the embodiments described herein, the cellulosic material is a composite cellulosic material or wood, e.g., oriented strand board (OSB).

In yet an additional aspect, the disclosure provides a candle wax formulation comprising a 150N foots oil and 600N slack wax. In certain embodiments, the composition comprises about 70% to about 80% of 150N foots oil. In some embodiments, the composition comprises about 20% to about 30% of 600N slack wax. In particular embodiments, the composition has an oil bleed less than about 100 mg (e.g., less than about 75 mg, less than about 50 mg, less than about 25 mg, or less than about 0 mg).

In an additional aspect, the disclosure provides items formed from the wax compositions as described herein. In certain embodiments, the wax items include a candle or a crayon. In a particular embodiment, the candle is a jar candle.

In an embodiment, the candle wax formulation of a jar candle comprises at least one of the following burning properties: a dropping point in a range of about 50° C. to about 58° C., a soot production in a range of about 400 to about 450 µg Soot/g wax, a melt pool depth of about 6 to about 14 mm (e.g., about 8 mm to about 12 mm), a flame height to melt pool ratio in a range of about 0.8 to about 1.2 (e.g., about 0.9 to about 1.1), and wax consumption per hour is about 1.8 to about 3 g/hour (e.g., about 2 to about 2.7 g/hour). In an embodiment, the melt pool depth and the flame height to melt pool ratio is based on a 4 hour burn cycle for the candle.

Where applicable or not specifically disclaimed, any one of the embodiments described herein are contemplated to be able to combine with any other one or more embodiments, even though the embodiments are described under different aspects of the disclosure.

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional advantages objects and embodiments are expressly included within the scope of the present disclosure. The publications and other materials used herein to illuminate the background of the disclosure, and in particular cases, to provide additional details respecting the practice, are incorporated by reference, and for convenience are listed in the appended bibliography.

BRIEF DESCRIPTION OF THE DRAWINGS

The accompanying drawings, which are incorporated into and form a part of the specification, illustrate several embodiments of the present disclosure and, together with the description, serve to explain the principles of the disclosure. The drawings are only for the purpose of illustrating an embodiment of the disclosure and are not to be construed as limiting the disclosure. Further objects, features and advantages of the disclosure will become apparent from the following detailed description taken in conjunction with the accompanying figures showing illustrative embodiments of the disclosure, in which.

DETAILED DESCRIPTION

Figure 1:
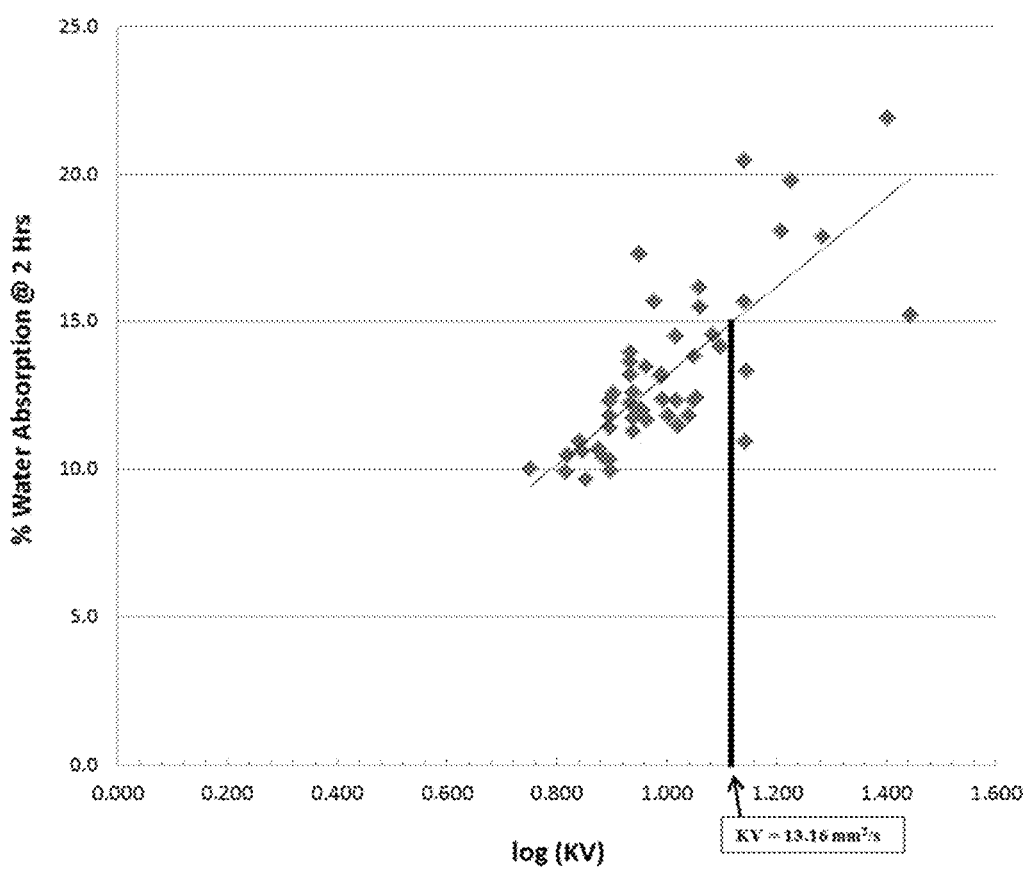
FIG. 1 is a plot of log kinematic viscosity versus percent water absorption at 2 hours for exemplary wax compositions as described herein. The graph shows the compositions with a kinematic viscosity less than or equal to a 13.16 mm$^2$/s have sufficient water repellency properties (i.e., below 15% at 2 hours) for composite board/oriented strand board applications. In comparison, composition with a kinematic viscosity greater than 13.16 mm$^2$/s do not have sufficient water repellency properties for composite board/oriented strand board application (i.e., greater than 15% at 2 hours).

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure. All publications, patent applications, patents, figures and other references mentioned herein are expressly incorporated by reference in their entirety.

Presently described are wax compositions and methods for making and using the same to improve the characteristics of cellulosic materials, e.g., composite cellulosic materials, such as composite board materials including oriented strand board (OSB). It was surprisingly and unexpectedly discovered that optimized wax compositions (wax or blend of waxes) suitable for use in these applications depend on the kinematic viscosity, and contact angle on a glass slide. In particular, it was surprisingly discovered that wax water repellency in composite board applications, such as OSB applications, has a strong linear dependency on the viscosity of the wax composition, with an upper limit on wax kinematic viscosity at about 13.1 mm$^2$/s measured at 100° C. can be defined, below which suitable performance of wax compositions in composite boards can be achieved irrespective of other compositional parameters of the wax composition. It was also surprisingly discovered that waxes that exhibit a low contact angle on glass, e.g., less than or equal to 34.4°, provide suitable water repellency performance in composite board applications. As such, the description provides wax compositions useful for coating of composite cellulosic materials or wood, e.g., OSB, etc., which have improved water proofing characteristics. Moreover, the description provides a unique set of wax compositional parameter specifications that surprisingly provide improved properties for use of the wax blend composition in coatings for composite cellulosic materials or wood, e.g., OSB, etc.

Conventional wisdom in the art is that a high n-paraffin content (e.g., greater than 21 wt. % n-paraffin) is beneficial or required for improved water proofing characteristics of the wax in particleboards, medium density fiberboards, and OSB. However, as described herein, it was surprisingly and unexpectedly discovered that the wax compositions described herein provide improved performance coating wood while providing improved water repellency as compared to currently used wax compositions for composite board applications, and allow for the identification of combinations of low value materials that are unsuitable for use in waterproofing applications to provide a wax composition with suitable water repellency in composite boards. As such, it is possible to utilize lower quantities of the compositions of the disclosure while achieving the same performance required by composite board applications. Furthermore, the criterion of the present disclosure provide wax refiners with the flexibility to blend available wax streams (e.g., lower value wax stream) that are unsuitable for composite board applications in a way that they become suitable for use in composite board applications. As such, petroleum-based waxes, triglyceride based waxes, asphalt and/or polymers may be combined for use in composite board applications utilizing the surprising and unexpected criterion disclosed herein.

The n-paraffins and oil content criteria is only applicable to paraffin waxes, Fischer-Tropsch waxes, or combinations of the same with base oils (i.e., petroleum based waxes), and as a result is limited to systems containing n-paraffins in the wax composition. In contrast, the physical characteristics of the present disclosure (i.e., parameters or criterion) can be applied to non-petroleum based waxes and petroleum based waxes. As such, the physical characteristics of the present disclosure can be applied to tallow and soy waxes, which are triglyceride based waxes that do not contain any n-paraffins. It was further surprisingly discovered that the relationships of the characteristics as described herein are applicable to complex blends of wax, including other non-paraffinic components such as asphalt or polymeric waxes. These compositions are markedly different from paraffinic waxes and contain no n-paraffins. The physical characteristics may be utilized to combine and optimize wax blends to provide suitable water repellency in composite boards in a cost effective manner. Indeed, the present disclosure allows for low value materials previously deemed unsuitable for use in waterproofing application to be identified to provide a composition that is more valuable than its constituents. As a result, the present disclosure more comprehensively defines wax compositions useful for composite board application (e.g., OSB) than previous work.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

It should also be understood that, unless clearly indicated to the contrary, in any methods claimed herein that include more than one step or act, the order of the steps or acts of the method is not necessarily limited to the order in which the steps or acts of the method are recited.

The following terms are used to describe the present disclosure. In instances where a term is not specifically defined herein, that term is given an art-recognized meaning by those of ordinary skill applying that term in context to its use in describing the present disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

The term "about" or "approximately" means an acceptable experimental error for a particular value as determined by one of ordinary skill in the art, which depends in part on how the value is measured or determined. All numerical values within the specification and the claims herein are modified by "about" or "approximately" the indicated value, and take into account experimental error and variations that would be expected by a person having ordinary skill in the art.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Composite board products used in the construction industry, such as particle board, MDF, wafer board, oriented strand board (OSB), and the like, are typically manufactured from natural fibrous materials, resin, and a wax composition.

The natural fibrous materials typically used include wood chips, wafers, saw dust, wood fibers, cotton and other plant fibers, straw, bamboo cellulose, and the like. The fibrous material generally comprises about 80 to 99 wt. % of the final board product.

Resins used in the production of manufactured board materials are well known to those skilled in the art of making construction board products and the choice will depend upon the particular compositional and economic needs of the manufacturer. Non-limiting examples of such resins are those thermosetting resins produced by the polycondensation of formaldehyde with other suitable compounds (e.g., phenol formaldehyde, urea formaldehyde, and melamine formaldehyde resins).

Wax Compositions

Described herein are wax compositions, including wax blends, suitable for a number of uses and applications, including, for example, for making a coating for composite cellulosic materials that provide improved water repellency characteristics. Specifically, the present description provides a unique set of wax compositional parameter specifications that surprisingly provide improved properties for use of the wax blend composition for coating composite cellulosic materials or wood, specifically for OSB, Synthetic waxes include waxes made by Fisher-Tropsch process from synthetic gas. Other synthetic waxes include polyethylene wax, ethylene copolymer wax, and carbo waxes.

Petroleum waxes include waxes recovered by, e.g., the solvent dewaxing of waxy hydrocarbon oil streams as part of the petroleum refinery process including slack waxes and also includes hydrocracked waxes. Other petroleum waxes include waxy petroleum stocks such as waxy distillates, raffinates, petrolatum, microcrystalline waxes, etc. For example, paraffin wax is a white or colorless soft solid derivable from petroleum, coal or oil shale by distillation. The feedstock for paraffin wax is slack wax, which is a mixture of oil and wax. The lower the percentage of oil in the wax the more refined it is considered (semi-refined versus fully refined). The product wax may be further processed to remove colors and odors.

Paraffins (general formula $C_nH_{2n+2}$; wherein n=1 through 400) are a mixture of hydrocarbons containing from about 18 to about 60 carbon atoms per molecule. Paraffins can be arranged either in straight chains (i.e., normal or n-paraffins) or branched chains (i.e., isoparaffins). Longer-chain paraffins are major constituents of waxes. Lower molecular weight paraffins have a lower boiling point, while higher molecular weight paraffins have a higher boiling point. Therefore, separation of paraffins by the carbon number is possible.

Non-petroleum waxes include triglyceride waxes and other biobased waxes (e.g., tallow waxes, soy waxes and palm waxes).

Coating compositions to provide a moisture as well as oil and grease barrier are commonly used on composite cellulosic and wood materials. With a reduction in available sources of wax, it has become ever more important to have the flexibility of blending different wax streams without deterioration in product properties.

Use of wax to provide water repellency in composite board products such as OSB, particleboard, medium density fiberboard, construction boards, etc., is a fast growing application of wax because of growth in the composite board industry. Wax is added to these manufactured wood products to provide suitable water repellency, since such cellulose based wood products easily wick in moisture which can lead to poor dimensional stability of these products. Previous studies on optimum wax compositions for water proofing of composite boards and specifically OSB, particleboards, and MDF boards points to n-paraffin content of waxes as the main compositional parameter affecting water repellency. In particular, previous studies have indicated composite board water proofing requires at least 21% n-paraffin for the wax composition to be suitable. However, conflicting information is available on the effect of wax compositional variables on their waterproofing performance in composite boards.

Composite board wood products such as OSB, particleboard, medium density fiberboard, construction boards, etc., have been made for several years and their methods of manufacturing are well-known in the industry. Typically, such wood products are made of cellulosic fibrous materials on which a minor amount of adhesive resin and wax is applied and then this combination is pressed together under high heat and pressure to make the ensuing manufactured wood product in the form of thin stiff sheets as desired. Wax is added to these manufactured wood products to provide suitable water repellency, since such cellulose based wood products easily wick in moisture which can lead to poor dimensional stability of these products. Hence resin in such cases binds the wood elements together and wax acts as a water repellant. Suitable resins or binders for such application, which can be included with any of the wax compositions as described herein, may include multifunctional isocyanates, diisocyanates, polymer dimethylene diisocyanantes, urethanes such as phenol formaldehyde resin, urea formadehyde resin, melamine formaldehyde resin, melamine urea formaldehyde resin, phenol urea formaldehyde resin, resorcinol/formaldehyde, phenol/resorcinol/formaldehyde; polyvinylacetate, polyvinyl alcohol; epoxies, acrylic resin; polysaccharides, such as starch, dextrin, hydroxyethyl cellulose, methyl cellulose, alginates and chitosan; and proteins, such as casein, soybased glue, blood glue, hide glue and bone glue.

The waxes used in the composite board industry are typically comparatively lower value slack waxes with a high oil content. While not so commonly described in the literature, the slack waxes used for manufacturing of OSB are typically a high viscosity grade wax and the slack waxes used in particleboard and MDF applications are typically low viscosity grade waxes. The viscosity typically is given as a SUS viscosity grade or Neutral member, e.g., 100N, 600N; a 100N grade having a lower viscosity and a 600N grade having a higher viscosity.

As described in Hudson et al. (U.S. Pat. No. 6,830,614), typically lower viscosity grade slack waxes have higher % n-paraffin content in the wax (see, e.g., Table 1). It is well-known in the art that the % n-paraffin content of waxes or the percent of straight chain linear alkanes in the wax versus branched or cyclical alkanes, plays a major role in water repellant efficacy of the wax (Hsu et al., "Water repellant efficacy of wax used in hardboard." Ind. Eng. Chem. Res., 1988, 27, 1296-1300; Roffael et. al., "Paraffin sizing of particleboards: chemical aspect." In. Maloney, Thomas M., ed. Proceedings, 17th international particleboard/composite materials symposium, 1983; and "For waterproofing medium density fiberboard with paraffins Part 1: influence of the chemical composition of the paraffin and the type of emulsifier on the waterproofing of MDF", Wood as raw materials and composites, 2005, 63, 192-203; Hudson et.al.; and Carll et al. "Review of thickness swell in hardboard siding", 1997, Forest products laboratory, general technical report FPL-GTR-96.). Hudson et al. proposed criteria to choose a suitable wax composition for OSB water repellency performance based on n-paraffin content of the wax being greater than 21% for all waxes greater than 550 N viscosity grade. Higher n-paraffin content in a wax is thought to provide improved water proofing performance. Hence, in general, the use of lower viscosity grade slack waxes should be preferred in composite board water proofing applications because they naturally tend to have a higher content of n-paraffins.

TABLE 1

Comparison of Wax Viscosity and n-Paraffin Content.

| Grade (SUS) | % n-paraffins |
|---|---|
| 100-300 | 45-65 |
| 300-500 | 35-50 |
| 500-650 | 10-35 |
| 650-850 | 5-20 |
| 850+ | 0-10 |

However, as described by Hudson et al., in the case of oriented strand board (OSB) application, heavy viscosity grade waxes (typically 550 N and above) are preferred to minimize volatility in wood presses that typically operate at over 400° F. versus particleboard and MDF boards which typically operate below 360° F. Therefore, it is preferred that waxes and sizing agents utilized in OSB have a flash point greater than about 450° F., e.g., limiting water proofing performance at 21% n-paraffin content as described by Hudson et al. for oriented strand board construction boards.

In work done by Hsu and Bender ("Water repellant efficacy of wax used in hardboard", Ind. Eng. Chem. Res., 1988, 27, 1296-1300) several Waxes labelled A through F with different oil content, n-paraffin content, molecular weights and molecular weight distributions were measured for water repellency on hardboards. The authors described that Wax A, with the highest molecular weight, had the greatest water repellency. However Wax B, with the lowest molecular weight, also showed equivalently high water repellency suggesting that factors other than molecular weight are important in contributing to water repellency. The authors also pointed out that Wax F, which had a high molecular weight but broad molecular weight distribution, had poor water repellency. Thus, the art teaches away from the present discovery and provides no understanding about the combination of compositional variables that may affect water repellency properties of wax.

Other methods to find suitable materials for OSB performance have concentrated on biobased waxes with specific characteristics (U.S. Pat. Nos. 8,076,006; 8,343,634; 6,277, 310; and U.S. Pat. No. 6,001,286) or blends of biobased waxes and petroleum waxes where the biobased waxes again had a specific characteristic (U.S. Pat. No. 8,071,209). The industry lacks, however, a definition of compositional property parameters that can universally be applied to different materials to make them suitable for use in OSB applications. Improved performance of wax or other waterproofing additives in composite boards, hardboards or other cellulosic coating applications have focused on use of extenders or additives in wax (U.S. Pat. Nos. 8,476,345 and 8,652,633) or use of nanoparticulate wax emulsions (U.S. Pat. No. 8,652, 633) for improved emulsion performance. Some references have describe the use of high contents of linear olefins or linear alkanes (n-alkanes) or a combination of both, typically above 50% to obtain acceptable waterproofing performance similar to past literature describing improved water proofing being directly related to amount of linear n-paraffin or n-alkane molecules in the wax. For example, Buchholz et al. (U.S. Pat. No. 8,231,763) describes the use of a combination of olefins and paraffin wax, wherein the olefins contain at least 50 mole % linear alpha-olefins and paraffin wax contains at least 60% linear n-alkanes. By way of another example, U.S. Pat. No. 8,748,516 describes the use of wax with 70-93% n-alkanes in the wax. Finally, U.S. Pat. No. 6,183,849 indicates that all hydrocarbonaceous materials containing 30-98% oil content will be acceptable for use in OSB.

The present description addresses the need in the art to be able to predict the suitability of wax composition for composite board manufacture, e.g., OSB applications, and to be able to adjust the wax composition, if needed, to be suitable for such board manufacture. As described above, rationalization of Group I base stock refining capacity around the globe has led to a declining availability of corresponding wax streams that are derived from these base stocks with the decline especially rapid for light neutral (low viscosity grade) waxes. However, with a reduction in available sources of wax, it has become ever more important to have the flexibility of blending different available wax streams without deterioration in product properties. Similarly, with reduced availability of wax streams, it has become even more important to combine the available wax streams in a manner such that the wax composition obtained is optimum for the application and the performance benefit from the wax is maximized. Maximizing performance benefit from available molecules and optimized wax compositions allows for getting the same benefit with less wax used in the application, thereby not only making the deficient wax molecules available to more customers but also reducing the cost of the wax.

In contrast, the present disclosures provides for wax compositions that may be utilized for OSB application that are selected based on their kinematic viscosity at 100° C., contact angle on glass, and/or flash point.

As described herein, it was surprisingly discovered that optimized wax compositions suitable for use in these applications, and specifically composite cellulosic or wood materials, such as OSB, are dependent on the kinematic viscosity measured at 100° C. and/or a contact angle on glass. However, the present description also relates to the efficacy of lower value waxes and wax blends, which may generally be considered to be unsuitable for waterproofing application.

The description provides non-intuitive wax compositions that can be used to provide improved water repellency properties in cellulosic or wood materials, e.g., composite boards, such as oriented strand boards. The wax composition parameters that provide optimum coating and water proofing in composite boards, e.g., OSB, include: a kinematic viscosity measured at 100° C. of less than or equal to 13.1 mm$^2$/s and/or a contact angle on glass of less than or equal to 34.4°. In The wax composition parameters that provide optimum coating and water proofing in composite boards, e.g., OSB, include: a kinematic viscosity measured at 100° C. of less than or equal to 13.1 mm$^2$/s and/or a contact angle on glass of less than or equal to 34.4°.

Figure 2:
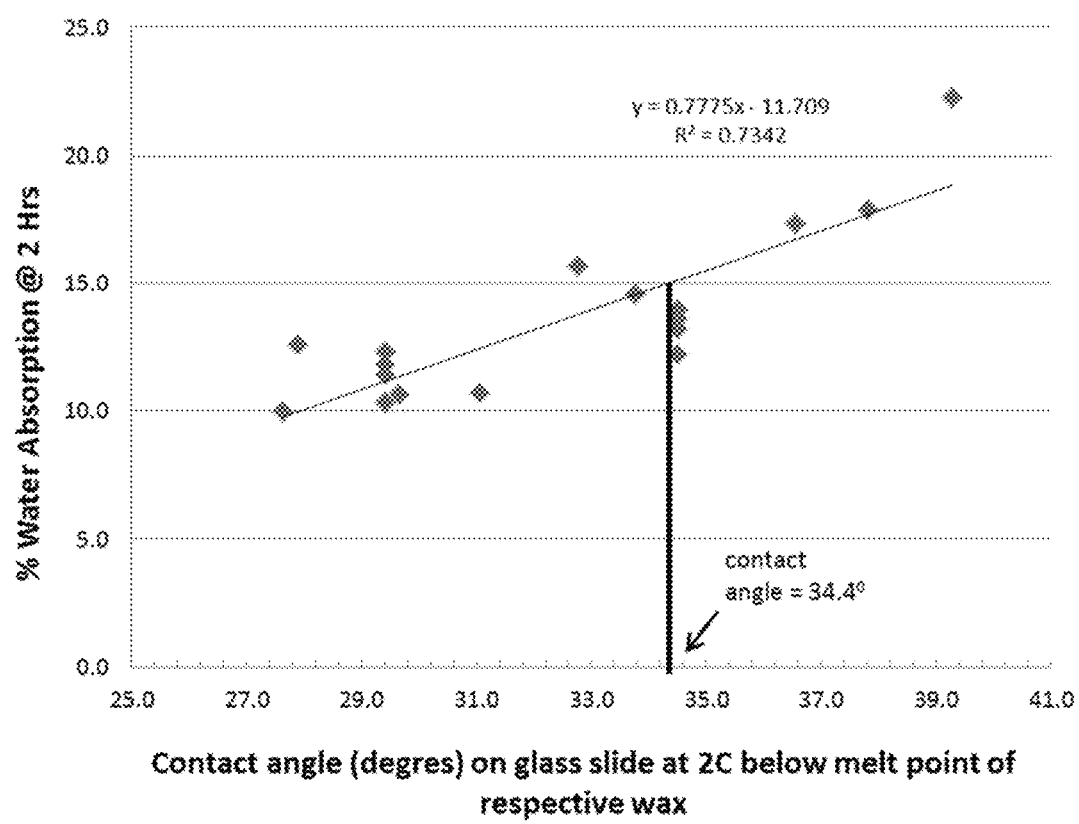
FIG. 2 is a plot of contact angle on glass slides versus percent water absorption at 2 hours for exemplary wax compositions as described herein. The graph shows the compositions with a contact angle equal to or less than 34.4° have sufficient water repellency properties (i.e., below 15% at 2 hours) for composite board/oriented strand board application. In contrast, was compositions with a contact angle greater than 34.4° do not have sufficient water repellency properties for composite board/oriented strand board applications (i.e., greater than 15% at 2 hours).

As can be seen in FIGS. 1 and 2, waxes that fall within the above parameters demonstrate superior coating ability, while providing suitable water repellency ability in composite board application, e.g., oriented strand board. Waxes that have a kinematic viscosity measured at 100° C. of less than or equal to 13.1 mm$^2$/s and a contact angle on glass of less than or equal to 34.4° are particularly effective for composite board applications. See Table 2 below.

Thus, the description provides a system for identifying and combining available low value wax streams that individually are not suitable or not optimized for waterproofing of coating composite cellulosic or wood materials in a way to make optimum wax compositions for use in composite cellulosic materials, e.g., composite board coatings including oriented strand board, thereby allowing for use of such wax streams in the application and increasing the value of low value wax molecules.

Accordingly, in one aspect, the disclosure provides wax compositions. In certain embodiments, the wax composition comprises at least one of: a kinematic viscosity measured at 100° C. of less than or equal to 13.1 mm$^2$/s; and a contact angle on glass of less than or equal to 34.4°. In additional embodiments, the wax composition has a flash point of at least 425° F. In additional embodiments, the wax composition has a flash point of at least 450° F. In certain embodiments, the wax composition comprises a kinematic viscosity measured at 100° C. of less than or equal to 13.1 mm$^2$/s and a contact angle on glass of less than or equal to 34.4°.

In additional embodiments, the kinematic viscosity is ≤about 13.5 mm$^2$/s, ≤about 13 mm$^2$/s, ≤about 12.5 mm$^2$/s, ≤about 12 mm$^2$/s, ≤about 11.5 mm$^2$/s, ≤about 11 mm$^2$/s, ≤about 10.5 mm$^2$/s, ≤about 10 mm$^2$/s, ≤about 9.5 mm$^2$/s, ≤9 about mm$^2$/s, ≤about 8.5 mm$^2$/s, about ≤8 mm$^2$/s, ≤about 7.5 mm$^2$/s, ≤about 7 mm$^2$/s, ≤about 6.5 mm$^2$/s, or ≤about 6 mm$^2$/s. In certain additional embodiments, the kinematic viscosity is in a range of about 4 to about 13.5 mm$^2$/s, about 4 to about 13 mm$^2$/s, about 4 to about 12.5 mm$^2$/s, about 4 to about 12 mm$^2$/s, about 4 to about 11.5 mm$^2$/s, about 4 to about 11 mm$^2$/s, about 4 to about 10.5 mm$^2$/s, about 4 to about 10 mm$^2$/s, about 4 to about 9.5 mm$^2$/s, about 4 to about 9 mm$^2$/s, about 4 to about 8.5 mm$^2$/s, about 4 to about 8 mm$^2$/s, about 4 to about 7.5 mm$^2$/s, about 4 to about 7 mm$^2$/s, about 4 to about 6.5 mm$^2$/s, about 4 to about 6 mm$^2$/s, about 4 to about 5.5 mm$^2$/s, about 4 to about 5 mm$^2$/s, about 4 to about 4.5 mm$^2$/s, about 4.5 to about 13.5 mm$^2$/s, about 4.5 to about 13 mm$^2$/s, about 4.5 to about 12.5 mm$^2$/s, about 4.5 to about 12 mm$^2$/s, about 4.5 to about 11.5 mm$^2$/s, about 4.5 to about 11 mm$^2$/s, about 4.5 to about 10.5 mm$^2$/s, about 4.5 to about 10 mm$^2$/s, about 4.5 to about 9.5 mm$^2$/s, about 4.5 to about 9 mm$^2$/s, about 4.5 to about 8.5 mm$^2$/s, about 4.5 to about 8 mm$^2$/s, about 4.5 to about 7.5 mm$^2$/s, about 4.5 to about 7 mm$^2$/s, about 4.5 to about 6.5 mm$^2$/s, about 4.5 to about 6 mm$^2$/s, about 4.5 to about 5.5 mm$^2$/s, about 4.5 to about 5 mm$^2$/s, about 5 to about 13.5 mm$^2$/s, about 5 to about 13 mm$^2$/s, about 5 to about 12.5 mm$^2$/s, about 5 to about 12 mm$^2$/s, about 5 to about 11.5 mm$^2$/s, about 5 to about 11 mm$^2$/s, about 5 to about 10.5 mm$^2$/s, about 5 to about 10 mm$^2$/s, about 5 to about 9.5 mm$^2$/s, about 5 to about 9 mm$^2$/s, about 5 to about 8.5 mm$^2$/s, about 5 to about 8 mm$^2$/s, about 5 to about 7.5 mm$^2$/s, about 5 to about 7 mm$^2$/s, about 5 to about 6.5 mm$^2$/s, about 5 to about 6 mm$^2$/s, about 5 to about 5.5 mm$^2$/s, about 5.5 to about 13.5 mm$^2$/s, about 5.5 to about 13 mm$^2$/s, about 5.5 to about 12.5 mm$^2$/s, about 5.5 to about 12 mm$^2$/s, about 5.5 to about 11.5 mm$^2$/s, about 5.5 to about 11 mm$^2$/s, about 5.5 to about 10.5 mm$^2$/s, about 5.5 to about 10 mm$^2$/s, about 5.5 to about 9.5 mm$^2$/s, about 5.5 to about 9 mm$^2$/s, about 5.5 to about 8.5 mm$^2$/s, about 5.5 to about 8 mm$^2$/s, about 5.5 to about 7.5 mm$^2$/s, about 5.5 to about 7 mm$^2$/s, about 5.5 to about 6.5 mm$^2$/s, about 5.5 to about 6 mm$^2$/s, about 6 to about 13.5 mm$^2$/s, about 6 to about 13 mm$^2$/s, about 6 to about 12.5 mm$^2$/s, about 6 to about 12 mm$^2$/s, about 6 to about 11.5 mm$^2$/s, about 6 to about 11 mm$^2$/s, about 6 to about 10.5 mm$^2$/s, about 6 to about 10 mm$^2$/s, about 6 to about 9.5 mm$^2$/s, about 6 to about 9 mm$^2$/s, about 6 to about 8.5 mm$^2$/s, about 6 to about 8 mm$^2$/s, about 6 to about 7.5 mm$^2$/s, about 6 to about 7 mm$^2$/s, about 6 to about 6.5 mm$^2$/s, about 6.5 to about 13.5 mm$^2$/s, about 6.5 to about 13 mm$^2$/s, about 6.5 to about 12.5 mm$^2$/s, about 6.5 to about 12 mm$^2$/s, about 6.5 to about 11.5 mm$^2$/s, about 6.5 to about 11 mm$^2$/s, about 6.5 to about 10.5 mm$^2$/s, about 6.5 to about 10 mm$^2$/s, about 6.5 to about 9.5 mm$^2$/s, about 6.5 to about 9 mm$^2$/s, about 6.5 to about 8.5 mm$^2$/s, about 6.5 to about 8 mm$^2$/s, about 6.5 to about 7.5 mm$^2$/s, about 6.5 to about 7 mm$^2$/s, about 7 to about 13.5 mm$^2$/s, about 7 to about 13 mm$^2$/s, about 7 to about 12.5 mm$^2$/s, about 7 to about 12 mm$^2$/s, about 7 to about 11.5 mm$^2$/s, about 7 to about 11 mm$^2$/s, about 7 to about 10.5 mm$^2$/s, about 7 to about 10 mm$^2$/s, about 7 to about 9.5 mm$^2$/s, about 7 to about 9 mm$^2$/s, about 7 to about 8.5 mm$^2$/s, about 7 to about 8 mm$^2$/s, about 7bto about 7.5 mm$^2$/s, about 7.5 to about 13.5 mm$^2$/s, about 7.5 to about 13 mm$^2$/s, about 7.5 to about 12.5 mm$^2$/s, about 7.5 to about 12 mm$^2$/s, about 7.5 to about 11.5 mm$^2$/s, about 7.5 to about 11 mm$^2$/s, about 7.5 to about 10.5 mm$^2$/s, about 7.5 to about 10 mm$^2$/s, about 7.5 to about 9.5 mm$^2$/s, about 7.5 to about 9 mm$^2$/s, about 7.5 to about 8.5 mm$^2$/s, about 7.5 to about 8 mm$^2$/s, about 8 to about 13.5 mm$^2$/s, about 8 to about 13 mm$^2$/s, about 8 to about 12.5 mm$^2$/s, about 8 to about 12 mm$^2$/s, about 8 to about 11.5 mm$^2$/s, about 8 to about 11 mm$^2$/s, about 8 to about 10.5 mm$^2$/s, about 8 to about 10 mm$^2$/s, about 8 to about 9.5 mm$^2$/s, about 8 to about 9 mm$^2$/s, about 8 to about 8.5 mm$^2$/s, about 8.5 to about 13.5 mm$^2$/s, about 8.5 to about 13 mm$^2$/s, about 8.5 to about 12.5 mm$^2$/s, about 8.5 to about 12 mm$^2$/s, about 8.5 to about 11.5 mm$^2$/s, about 8.5 to about 11 mm$^2$/s, about 8.5 to about 10.5 mm$^2$/s, about 8.5 to about 10 mm$^2$/s, about 8.5 to about 9.5 mm$^2$/s, about 8.5 to about 9 mm$^2$/s, about 9 to about 13.5 mm$^2$/s, about 9 to about 13 mm$^2$/s, about 9 to about 12.5 mm$^2$/s, about 9 to about 12 mm$^2$/s, about 9 to about 11.5 mm$^2$/s, about 9 to about 11 mm$^2$/s, about 9 to about 10.5 mm$^2$/s, about 9 to about 10 mm$^2$/s, about 9 to about 9.5 mm$^2$/s, about 9.5 to about 13.5 mm$^2$/s, about 9.5 to about 13 mm$^2$/s, about 9.5 to about 12.5 mm$^2$/s, about 9.5 to about 12 mm$^2$/s, about 9.5 to about 11.5 mm$^2$/s, about 9.5 to about 11 mm$^2$/s, about 9.5 to about 10.5 mm$^2$/s, about 9.5 to about 10 mm$^2$/s, about 10 to about 13.5 mm$^2$/s, about 10 to about 13 mm$^2$/s, about 10 to about 12.5 mm$^2$/s, about 10 to about 12 mm$^2$/s, about 10 to about 11.5 mm$^2$/s, about 10 to about 11 mm$^2$/s, about 10 to about 10.5 mm$^2$/s, about 10.5 to about 13.5 mm$^2$/s, about 10.5 to about 13 mm$^2$/s, about 10.5 to about 12.5 mm$^2$/s, about 10.5 to about 12 mm$^2$/s, about 10.5 to about 11.5 mm$^2$/s, about 10.5 to about 11 mm$^2$/s, about 11 to about 13.5 mm²/s, about 11 to about 13 mm²/s, about 11 to about 12.5 mm²/s, about 11 to about 12 mm²/s, about 11 to about 11.5 mm²/s, about 11.5 to about 13.5 mm²/s, about 11.5 to about 13 mm²/s, about 11.5 to about 12.5 mm²/s, about 11.5 to about 12 mm²/s, about 12 to about 13.5 mm²/s, about 12 to about 13 mm²/s, about 12 to about 12.5 mm²/s, about 12.5 to about 13.5 mm²/s, about 12.5 to about 13 mm²/s, or about 13 to about 13.5 mm²/s.

In certain embodiments, the wax composition has a contact angle on glass is ≤about 35°. In some embodiments, the wax composition has a contact angle on glass is ≤about 34.5°, ≤about 34°, ≤about 33.5°, ≤about 33°, ≤about 32.5°, ≤about 32°, ≤about 31.5°, ≤about 31°, ≤about 30.5°, ≤about 30°, ≤about 29.5°, ≤about 29°, ≤about 28.5°, ≤about 28°, ≤about 27.5°, ≤about 27°, ≤about 26.5°. In particular embodiments the wax composition has a contact angle on glass of about 35, about 34.5°, about 34°, about 33.5°, about 33°, about 32.5°, about 32°, about 31.5°, about 31°, about 30.5°, about 30°, about 29.5°, about 29°, about 28.5°, about 28°, about 27.5°, about 27°, or about 26.5°. In certain embodiments, the wax composition has a contact angle in a range of about 26° to about 35°, about 26° to about 34°, about 26° to about 33°, about 26° to about 32°, about 26° to about 31°, about 26° to about 30°, about 26° to about 29°, about 26° to about 28°, about 26° to about 27°, about 27° to about 35°, about 27° to about 34°, about 27° to about 33°, about 27° to about 32°, about 27° to about 31°, about 27° to about 30°, about 27° to about 29°, about 27° to about 28°, about 28° to about 35°, about 28° to about 34°, about 28° to about 33°, about 28° to about 32°, about 28° to about 31°, about 28° to about 30°, about 28° to about 29°, about 29° to about 35°, about 29° to about 34°, about 29° to about 33°, about 29° to about 32°, about 29° to about 31°, about 29° to about 30°, about 30° to about 35°, about 30° to about 34°, about 30° to about 33°, about 30° to about 32°, about 30° to about 31°, about 31° to about 35°, about 31° to about 34°, about 31° to about 33°, about 31° to about 32°, about 32° to about 35°, about 32° to about 34°, about 32° to about 33°, about 33° to about 35°, about 33° to about 34°, or about 34° to about 33°.

In any of the aspects or embodiments described herein, the resulting wax composition provides a particle board (e.g., OSB) with a low water absorption in a 2 hour water soak test, of ≤about 20%. In certain embodiments, the water absorption is ≤about 19%, ≤about 18%, ≤about 17%, ≤about 16%, ≤about 15%, ≤about 14%, ≤about 13%, ≤about 12%, ≤about 11%, ≤about 10%, ≤about 9%, ≤about 8%, ≤about 7%, or ≤about 6%. In particular embodiments, the water absorption is about 20%, about 19%, about 18%, about 17%, about 16%, about 15%, about 14%, about 13%, about 12%, about 11%, about 10%, about 9%, about 8%, about 7%, or about 6%. In an embodiment, the water absorption is in a range of about 6% to about 20%, about 6% to about 19%, about 6% to about 18%, about 6% to about 17%, about 6% to about 16%, about 6% to about 15%, about 6% to about 14%, about 6% to about 13%, about 6% to about 12%, about 6% to about 11%, about 6% to about 10%, about 6% to about 9%, about 6% to about 8%, about 6% to about 7%, about 7% to about 20%, about 7% to about 19%, about 7% to about 18%, about 7% to about 17%, about 7% to about 16%, about 7% to about 15%, about 7% to about 14%, about 7% to about 13%, about 7% to about 12%, about 7% to about 11%, about 7% to about 10%, about 7% to about 9%, about 7% to about 8%, about 8% to about 20%, about 8% to about 19%, about 8% to about 18%, about 8% to about 17%, about 8% to about 16%, about 8% to about 15%, about 8% to about 14%, about 8% to about 13%, about 8% to about 12%, about 8% to about 11%, about 8% to about 10%, about 8% to about 9%, about 9% to about 20%, about 9% to about 19%, about 9% to about 18%, about 9% to about 17%, about 9% to about 16%, about 9% to about 15%, about 9% to about 14%, about 9% to about 13%, about 9% to about 12%, about 9% to about 11%, about 9% to about 10%, about 10% to about 20%, about 10% to about 19%, about 10% to about 18%, about 10% to about 17%, about 10% to about 16%, about 10% to about 15%, about 10% to about 14%, about 10% to about 13%, about 10% to about 12%, about 10% to about 11%, about 11% to about 20%, about 11% to about 19%, about 11% to about 18%, about 11% to about 17%, about 11% to about 16%, about 11% to about 15%, about 11% to about 14%, about 11% to about 13%, about 11% to about 12%, about 12% to about 20%, about 12% to about 19%, about 12% to about 18%, about 12% to about 17%, about 12% to about 16%, about 12% to about 15%, about 12% to about 14%, about 12% to about 13%, about 13% to about 20%, about 13% to about 19%, about 13% to about 18%, about 13% to about 17%, about 13% to about 16%, about 13% to about 15%, about 13% to about 14%, about 14% to about 20%, about 14% to about 19%, about 14% to about 18%, about 14% to about 17%, about 14% to about 16%, about 14% to about 15%, about 15% to about 20%, about 15% to about 19%, about 15% to about 18%, about 15% to about 17%, about 15% to about 16%, about 16% to about 20%, about 17% to about 19%, about 17% to about 18%, about 18% to about 20%, about 18% to about 19%, or about 19% to about 20%.

In additional embodiments, the wax composition has a flash point of at least 415° F. In additional embodiments, the wax composition has a flash point of at least 420° F., at least 425° F., at least 430° F., at least 435° F., at least 440° F., at least 445° F., at least 450° F., at least 455° F., or at least 460° F.

The discovery as described herein provides flexibility for wax refiners to allow for blending available wax streams, and to formulate an optimized wax product in a way that they may be made suitable for use as a composite board coating. With the rationalization of group 1 refining capacity around the world and sharply declining availability of high quality wax streams, a flexibility to use different wax streams to make a suitable product provides a significant advantage and is essential for the sustainability of the wax business.

In certain embodiments, the resulting wax composition provides a low (particleboard) water absorption in a 2 hr water soak test, typically less than about 15%. The water absorption is measured as the % increase in weight of the particleboard in a 2 hour water soak of the board according to a modified Grade Properties CSA O437.0-93 Test Standard method (modification—because there are no requirements for 2 Hour Thickness Swell and Edge Swell, which were also measured in this test).

For example, methods to improve performance of wax or other waterproofing additives in composite boards, hardboards or other cellulosic coating applications have focused on use of extenders or additives in wax (Briner et. al.[9], Buchholz et. al.[10]) or use of nanoparticulate wax emulsions (Buchholz et.al.[11]) for improved emulsion performance. Other references have talked about use of high contents of linear olefins or linear alkanes (n-alkanes) or a combination of both, typically above 50% to obtain acceptable waterproofing performance, similar to past literature describing improved water proofing being directly related to amount of linear n-paraffins or n-alkanes molecules in the wax. Examples of such are Buchholz et.al.[12], which describes use of a combination of olefins and paraffin wax, wherein the olefins contain at least 50 mol % linear alpha-olefins and paraffin wax contains at least 60% linear n-alkanes. Another example by Winterowd et.al.[13] talks about use of wax with 70-93% n-alkanes in the wax.

In another aspect, the description provides composition comprising a wax composition as described herein, and a cellulosic binder or resin, e.g., cross-linker, suitable for binding composite board materials, such as oriented strand board. Such binders include, e.g., acrylates, latex, polyurethanes, or other binders known in the art. In an exemplary method, coating compositions can be prepared accordingly to the steps of combining and dispersing a resin or cellulosic binder in a molten wax as described herein, and stirring at high speeds. Suitable resins or binders for such application may include multifunctional isocyanates, diisocyanates, polymer dimethylene diisocyanantes, urethanes such as phenol formaldehyde resin, urea formadehyde resin, melamine formaldehyde resin, melamine urea formaldehyde resin, phenol urea formaldehyde resin, resorcinol/formaldehyde, phenol/resorcinol/formaldehyde; polyvinylacetate, polyvinyl alcohol; epoxies, acrylic resin; polysaccharides, such as starch, dextrin, hydroxyethyl cellulose, methyl cellulose, alginates and chitosan; and proteins, such as casein, soy-based glue, blood glue, hide glue and bone glue.

In yet an additional aspect, the disclosure provides a candle wax formulation comprising a 150N foots oil and 600N slack wax. In certain embodiments, the composition comprises about 70% to about 80% 150N foots oil. In particular embodiments, the composition has an oil bleed less than about 100 mg (e.g., less than about 75 mg, less than about 50 mg, less than about 25 mg, or less than about 0 mg).

In an additional aspect, the disclosure provides items formed from the wax compositions as described herein. In certain embodiments, the wax items include a candle or a crayon. In a particular embodiment, the candle is a jar candle.

In an embodiment, the candle wax formulation of a jar candle comprises at least one of the following burning properties: a dropping point in a range of about 50° C. to about 58° C., a soot production in a range of about 400 to about 450 µg Soot/g wax, a melt pool depth of about 6 to about 14 mm (e.g., about 8 mm to about 12 mm), a flame height to melt pool ratio in a range of about 0.8 to about 1.2 (e.g., about 0.9 to about 1.1), and wax consumption per hour is about 1.8 to about 3 g/hour (e.g., about 2 to about 2.7 g/hour). In an embodiment, the above properties are based on a 4 hour burn cycle for the candle.

The candle wax formulations of the present disclosure provide superior performance in controlling oil bleed despite a high oil-in-wax content and achieve a smoother exterior finish. The individual components of the candle wax compositions of the present disclosure are not good candle wax candidates. This is because foots oil with as much as 40% oil has excessive sooting upon burning and the high melting point of 600N slack waxes (greater than 60° C.) result in wax tunneling upon burning, both of which are not favorable for candle jar wax formulations.

The candle jar wax compositions of the present disclosure have lower wax consumption versus currently utilized waxes. Furthermore the flame height to melt pool ratio of the candle jar was compositions of the present disclosure are at approximately the desired target value of 1. Although the degree of sooting is greater than the currently utilized waxes, the proposed wax blends have very low sooting behavior in comparison to many waxes currently available for candle applications. In fact, the candle jar was compositions of the present disclosure are on par with premium candle waxes, but sources from low value wax streams, e.g., stranded wax stream (foots oil).

Coating Methods/Articles

In still an additional aspect, the disclosure provides methods of using the wax compositions as described herein. In certain embodiments, the disclosure provides a method of forming a wax-coated article or material comprising providing the item and applying a coating of the wax composition as described herein.

In certain embodiments, the disclosure provides a method of forming a wax-coated cellulosic composite material comprising providing a composite cellulosic article or material having a surface, forming or providing a wax composition as described herein and applying the wax composition to the cellulosic article or material. In certain embodiments, the cellulosic material is saturated with the wax composition. In certain additional embodiments, the cellulosic material is partially coated. In any of the embodiments described herein, the cellulosic material is a composite cellulosic material or wood, e.g., oriented strand board.

The composite boards described here can be made by combining natural fibrous materials, resin and wax under high heat and pressure to form the composite board. The wax in these applications can be applied either as neat molten wax or as a wax in water emulsion. The neat molten wax is generally sprayed on the cellulosic material while the wax in water emulsion can be sprayed or added directly into slurry prior to board formation.

When attempting to apply the wax composition to a surface of a cellulosic material, increased viscosity can create difficulties in creating a coating that is both thin and sufficiently continuous to provide improved water resistance to the underlying material. At higher viscosities, the coating thickness required to maintain a substantially continuous coating is greater, thus requiring an increased amount of the wax to coat a given surface. Higher viscosities can also require higher processing temperatures during application of the wax.

The disclosure provides methods of using the wax compositions as described herein. In certain embodiments, the disclosure provides a method of forming a wax-coated article or material comprising providing the item and applying a coating of the wax composition as described herein. In certain embodiments, the disclosure provides a method of forming a wax-coated cellulosic material comprising providing a cellulosic article or material having a surface, forming or providing a wax composition as described herein and applying the wax composition to the cellulosic article or material. In certain embodiments, the cellulosic material is saturated with the wax composition. In certain additional embodiments, the cellulosic material is partially coated. In any of the embodiments described herein, the cellulosic material is a composite cellulosic material.

In various aspects, wax compositions are provided with improved properties for various applications, such as coating of composite cellulosic materials or wood, specifically in oriented strand board. Wax compositions as described herein provide improved performance as wood coating in providing equivalent or better water repellency as compared to the products available in the market are identified, possibly also allowing for use of less wax to provide the same performance for the customer thereby reducing the cost for the customer. Specifically, the description provides a unique set of wax compositional parameter specifications that surprisingly provide improved properties for use of the wax blend composition in coatings for composite cellulosic materials or wood, specifically in oriented strand boards.

In an additional aspect, the disclosure provides a cellulosic material coated with a wax composition as described herein. In certain embodiments, the cellulosic material is completely saturated or coated with the wax composition. In additional embodiments, the cellulosic material is partially saturated or coated. In certain embodiments, the description provides a wax coated composite cellulosic article comprising a cellulosic surface including from about 0.1% by weight to about 90% by weight of cellulosic material, e.g., the oriented strand board. In certain embodiments, the wax coated cellulosic article is a composite cellulosic material or wood, more specifically oriented strand board. In a preferred embodiment, the resulting coated composite cellulose material or wood has a water absorption of typically less than about 17%. The water absorption is measured as the % increase in weight of the oriented strand board, as described above and below. In certain embodiments, the resulting coated composite cellulosic material or wood has a water absorption of less than 15%, or less than 10%, including all values in between.

The wax in the composition can be a mineral wax such as paraffin wax or microwax (microcrystalline wax); vegetable or animal derived bio-wax; synthetic wax such as Fischer-Tropsch wax or polyethylene wax; semi-crystalline waxes; or combinations of two or more waxes and/or two or more types of waxes.

Methods of Manufacture of Wax Compositions

In an additional aspect, the disclosure provides methods of making the wax compositions as described herein. In certain embodiments, the method includes admixing two or more waxes such that the resulting wax has at least one of a kinematic viscosity measured at 100° C. of ≤13.1 mm$^2$/s, and a contact angle on glass of ≤34.4°. In a particular embodiment, the two or more waxes are not suitable for composite board applications, such as oriented strand board applications.

In certain embodiments, the resulting wax composition provides a water absorption of typically less than or equal to about 17%. In certain embodiments, the resulting wax composition provides a water absorption of less than 15%, or less than 10%, including all values in between.

In certain embodiments, the wax composition as described herein has a kinematic viscosity measured at 100° C. of ≤13.1 mm$^2$/s; and a contact angle on glass of ≤34.4°.

As would be understood by those of skill in the art, the above described physical characteristics can be combined in a number of ways to define waxes encompassed by the present description, all of which are expressly contemplated and incorporated herein. For example, the wax composition of the present disclosure can have a kinematic viscosity measured at 100° C. of ≤12.5 mm$^2$/s; and a contact angle on glass of ≤33°.

The components of the wax formulation can be combined through various processes known in the art.

Paraffin waxes are petroleum derived and primarily derived from solvent dewaxing of lubricant basestocks. After separation of lubricant basestocks, the waxes obtained are typically slack waxes having a high oil content of 5-50%. Slack waxes can be further deoiled to an oil content of 1-5% and will be called scale wax in that case or to less than 1% oil content and would be called fully refined paraffin wax in the latter case. Depending upon the distillation cut, these waxes could belong to any of the viscosity grades as described in Table 1 and thus could be a light, medium of heavy viscosity grade. Due to lower level of refining, slack waxes have a much lower market value than fully refined waxes.

As discussed earlier, light viscosity grade slack waxes typically have a higher n-paraffin content than heavy viscosity grades slack waxes and hence are preferred for use in wood and composite board coatings, since the industry perception is that higher n-paraffin content provides improved water repellency. One exception is oriented strand board construction/composite board application, where use of heavy neutral slack waxes is customary, because of use of higher processing plate temperatures, which necessitate the use of larger molecular weight waxes, which are less volatile.

The composite boards of the present disclosure, e.g., oriented strand board, can be made by combining natural fibrous materials, resin and wax under high heat and pressure to form the engineered board. The wax of the disclosure can be applied either as neat molten wax or as a wax in water emulsion. Neat molten wax can be sprayed on the cellulosic material, while wax in a water emulsion can be sprayed or added directly into a slurry prior to board formation.

In an exemplary method, coating compositions can be prepared accordingly to the steps of spraying a molten wax on to the cellulosic fiber mix or directly to the fiberboard together with application of heat and pressure. Suitable resins or binders for such application may include multifunctional isocyanates, diisocyanates, polymer dimethylene diisocyanantes, urethanes such as phenol formaldehyde resin, urea formadehyde resin, melamine formaldehyde resin, melamine urea formaldehyde resin, phenol urea formaldehyde resin, resorcinol/formaldehyde, phenol/resorcinol/formaldehyde; polyvinylacetate, polyvinyl alcohol; epoxies, acrylic resin; polysaccharides, such as starch, dextrin, hydroxyethyl cellulose, methyl cellulose, alginates and chitosan; and proteins, such as casein, soybased glue, blood glue, hide glue and bone glue.

In another aspect, the molten wax formulation can be mixed with water and surfactants in various concentrations and further agitated with a high shear mixing equipment like a homogenizer to form a wax emulsion. This emulsion can then be either sprayed on to the cellulosic fiber mix or directly to the fiberboard or added directly into slurry prior to board formation. Emulsion formulations in some instance can lead to improved performance of the coating.

In yet another aspect, an option for making the wax (coating) composition can be to melt and homogenize the wax by stirring and heating it in a vessel at a temperature at least about 10° C. above the melting temperature of the wax. Additives, if any, can then be blended into the wax at a temperature that is at least about 5° C. to about 20° C. above the melt temperature of the additive, together with continuous stirring for sufficient time to fully dissolve or disperse the additive in the molten wax at rest. The wax composition can be sprayed on to the cellulosic fiber mix or directly to the fiberboard together with application of heat and pressure Methods of Manufacturing Wax Compositions as Described Herein In an additional aspect, the disclosure provides methods of making the wax compositions as described herein. The flexibility and availability of wax product streams that can be used to make the wax compositions as described herein thereby can reduce the cost of the wax product to the customer.

In an additional aspect, the disclosure provides methods of making the wax compositions as described herein. In certain embodiments, the method includes admixing two or more waxes such that the resulting composition has a kinematic viscosity measured at 100° C. of less than or equal to 13.1 mm²/s or a contact angle on glass of less than or equal to 34.4°. In a particular embodiment, the wax composition has a kinematic viscosity measured at 100° C. of less than or equal to 13.1 mm²/s and a contact angle on glass of less than or equal to 34.4°.

The components of the wax formulation can be combined through various different processes known to those of skill in the art. By way of nonlimiting example, the description provides a method of making the wax compositions as described herein according to the steps of admixing the wax components, melting and homogenizing the waxes by stirring and heating the mixture in a vessel at a temperature approximately 15° C. above the melting temperature of the higher melting wax, and blending an additive, e.g., a polymer or inorganic clay or ceramic, in the wax at a temperature of approximately 5 to 20° C. above the melt temperature of the polymer together with continuous stirring for sufficient time to fully dissolve the polymer in the molten wax at rest.

In certain embodiments, the method includes a step of admixing the wax components as well as the additives and heating to a temperature sufficient to completely melt all components in the mixture while stirring.

EXAMPLES

The current state of the art in the OSB industry in North America uses heavy viscosity grade, heavy neutral slack waxes (i.e., high n-paraffin content waxes) that have lower cost than fully refined waxes.

Examination of Sample Waxes and OSB Panel Production. An external pilot plant facility was used to manufacture the OSB panels and test the sample waxes, which are shown in Table 2. Each of the sample waxes was applied in a molten slack wax form and the resulting OSB sample was evaluated for water repellency (percent water absorption and percent thickness swell) properties in a typical OSB manufacture process.

The facility supplied commercial aspen oriented strand board (OSB) strands with fines removed using a 3 ft×8 ft BM&M deck screener and a 0.125 in screen hole size. The wax samples were applied at a rate of 1.0% solids. Wax was applied with heated air nozzles set at 196° F. and applied to the surface and core strands in a drum blender. All waxes were preheated to 230° F. in an oven prior to application. The surface strands were blended with a commercial liquid phenol formaldehyde (LPF) resin at a rate of 3.5% solids basis. A commercial polymeric diphenylmethane diisocyanate (pMDI) resin was applied to the core strands at a rate of 2.0% solids basis. Both resins were applied in a drum blender with a spinning disk atomizer. Drum blender setting when applying slack wax was 13 RPM. Drum blender setting when applying either surface or core resins was 23 RPM. Spinning disk atomizer set at 12,000 RPM when applying commercial polymeric diphenylmethane diisocyanate (pMDI) resin to core strands. Spinning disk atomizer set at 10,500 RPM, when applying commercial Liquid Phenol Formaldehyde (LPF) to surface strands. The moisture content of the strands was targeted at 7% for the surface and 4% for the core. The blended materials were then formed into mats measuring 34 in×34 in with a 55/45 surface to core weight ratio. The pressed panels were targeted for a density of 39.0 lb/ft³ and a thickness of 0.437 in. The press temperature was 402° F. AITF's PressMAN Press Monitoring System was used to program, monitor, and control the press. The panel specifications can be found in Table 3. After pressing, the panels were trimmed to 28 in×28 in and then measured for out-of-press thickness and density. All panels were then forwarded to an external laboratory for cutting and evaluation. The tests were performed in accordance with a modified "Grade Properties CSA O437.0-93 test standard". The tests standard measured herein measured 2 Hour Thickness Swell and Edge Swell, which is not required by the O437.0 standard. The test results of the OSB panels are shown in Table 2 and FIGS. 1 and 2.

TABLE 2

Physical characteristics of wax samples

| Sample Name | Kinematic Viscosity (KV) @100 C. (ASTM D-445) | log KV | Flash Point (C.) (ASTM D92) | Contact angle on glass (degree) | Water Absorption @ 2 hrs | Wax Type |
| --- | --- | --- | --- | --- | --- | --- |
| Blend A | 8.9 | 0.95 | | 36.6 | 17.3 | biobased wax |
| Blend B | 8.6 | 0.93 | | 34.5 | 14.0 | Triglyceride based wax |
| Blend C | 7.9 | 0.90 | 272 | 27.6 | 10.0 | paraffin based slack wax |
| Blend D | 11.0 | 1.04 | | | 11.8 | paraffin based slack wax + polymer |
| Blend E | 10.1 | 1.00 | | | 11.8 | paraffin based slack wax + polymer |
| Blend F | 10.5 | 1.02 | | | 11.5 | paraffin based slack wax + polymer |
| Blend G | 19.3 | 1.28 | 282 | 37.8 | 17.9 | paraffin based slack wax |
| Blend H | 25.2 | 1.40 | | | 21.9 | paraffin based slack wax + polymer |
| Blend I | 11.5 | 1.06 | | | 16.2 | Triglyceride based wax + polymer |
| Blend J | 7.9 | 0.90 | 272 | 29.4 | 12.3 | paraffin based slack wax |
| Blend K | 8.7 | 0.94 | | | 12.6 | paraffin based slack wax |
| Blend L | 9.2 | 0.96 | | | 13.5 | paraffin based slack wax |
| Blend M | 11.2 | 1.05 | | | 13.8 | paraffin based slack wax |
| Blend N | 16.2 | 1.21 | | | 18.1 | paraffin based slack wax |
| Blend O | 9.5 | 0.98 | | 32.8 | 15.7 | aspahlt + paraffin based slack wax |
| Blend P | 12.1 | 1.08 | | 33.8 | 14.5 | aspahlt + paraffin based slack wax |
| Blend Q | 7.9 | 0.90 | 272 | 29.4 | 11.4 | paraffin based slack wax |
| Blend R | 5.6 | 0.75 | 240 | | 10.0 | paraffin based slack wax |
| Blend S | 6.6 | 0.82 | 254 | | 10.5 | paraffin based slack wax |
| Blend T | 6.9 | 0.84 | 260 | | 10.9 | paraffin based slack wax |
| Blend U | 14.0 | 1.14 | | | 13.3 | aspahlt + paraffin based slack wax |
| Blend V | 8.0 | 0.90 | 272 | 27.9 | 12.6 | paraffin based slack wax |
| Blend X | 10.4 | 1.02 | 282 | | 14.5 | paraffin based slack wax |
| Blend Y | 11.5 | 1.06 | 284 | | 15.5 | paraffin based slack wax |
| Blend Z | 12.6 | 1.10 | 288 | | 14.1 | paraffin based slack wax |

TABLE 2-continued

Physical characteristics of wax samples

| Sample Name | Kinematic Viscosity (KV) @100 C. (ASTM D-445) | log KV | Flash Point (C.) (ASTM D92) | Contact angle on glass (degree) | Water Absorption @ 2 hrs | Wax Type |
|---|---|---|---|---|---|---|
| Blend AA | 13.9 | 1.14 | 288 |  | 15.7 | paraffin based slack wax |
| Blend AB | 8.6 | 0.93 |  | 34.5 | 13.6 | Triglyceride based wax |
| Blend AC | 16.9 | 1.23 |  |  | 19.8 | paraffin based slack wax |
| Blend AD | 9.8 | 0.99 | 242 |  | 13.2 | paraffin based slack wax |
| Blend AE | 13.8 | 1.14 | 260 |  | 20.5 | paraffin based slack wax |
| Blend AF | 6.6 | 0.82 |  |  | 9.9 | paraffin based slack wax |
| Blend AG | 7.1 | 0.85 |  |  | 9.7 | paraffin based slack wax |
| Blend AH | 11.2 | 1.05 |  |  | 12.3 | paraffin based slack wax |
| Blend AI | 13.9 | 1.14 |  |  | 10.9 | aspahlt + paraffin based slack wax |
| Blend AJ | 9.2 | 0.96 | 276 |  | 11.7 | paraffin based slack wax |
| Blend AK | 8.6 | 0.93 |  | 34.5 | 12.2 | Triglyceride based wax |
| Blend AL | 7.9 | 0.90 | 272 | 29.4 | 10.3 | paraffin based slack wax |
| Blend AM | 7.9 | 0.90 | 272 | 29.4 | 11.8 | paraffin based slack wax |
| Blend AN | 7.0 | 0.85 |  | 29.7 | 10.6 | paraffin based slack wax |
| Blend AO | 8.7 | 0.94 | 274 |  | 11.8 | paraffin based slack wax |
| Blend AP | 10.4 | 1.02 | 282 |  | 12.3 | paraffin based slack wax |
| Blend AQ | 11.3 | 1.05 | 284 |  | 12.4 | paraffin based slack wax |
| Blend AR | 9.0 | 0.96 | 261 |  | 12.0 | paraffin based slack wax |
| Blend AS | 8.7 | 0.94 | 258 |  | 11.3 | paraffin based slack wax |
| Blend AT | 8.6 | 0.93 |  | 34.5 | 13.2 | Triglyceride based wax |
| Blend AU | 7.5 | 0.88 | 266 | 31.1 | 10.7 | paraffin based slack wax |
| Blend AV | 9.8 | 0.99 | 260 |  | 13.2 | paraffin based slack wax |
| Blend AX | 9.0 | 0.95 | 262 |  | 12.0 | paraffin based slack wax |
| Blend AY | 7.7 | 0.88 | 268 |  | 10.4 | paraffin based slack wax |
| Blend AZ | 9.0 | 0.96 | 270 |  | 12.0 | paraffin based slack wax |
| Blend BA | 9.9 | 0.99 | 272 |  | 12.4 | paraffin based slack wax |
| Blend BB | 27.7 | 1.44 |  |  | 15.2 | aspahlt + paraffin based slack wax |
| Blend BC* | 5.5 | 0.74 |  | 39.3 | 22.2 | biobased wax |

TABLE 3

Panel Specifications

Target Dimension - 28 in × 28 in
Target Thickness - 0.437 in
Target Density - 39.0 lb/ft³
Mat Construction - Commercial OSB Strands
3 ft × 8 ft BM&M deck screened ≥0.125 in
34 in × 34 in Hand Formed
Random Orientation
55/45 (Surface/Core) Mat Split
Resin Components Surface - Commercial Liquid Phenol Formaldehyde (LPF)
Core - Commercial pMDI
Press/Mat Setup - Fixed Metal Top Plate, Formed Mat, Sealed Screen, Fixed Metal Bottom Plate
Press Temperature - 402° F.
Press Time - 180 sec The maximum allowable percent of water absorption in OSB application after exposure to water for 2 hours is 15% for an OSB panel/board with 1% of sample wax applied. As can be seen in Table 2 and FIG. 1, OSB panels with sample waxes with a kinematic viscosity (KV)@100° C. of about 13.1 mm²/s or less (e.g., a log (KV) of about 1.4 or less) have % water absorption at 2 hours of about 15% or less. Similarly, OSB panels with sample waxes with a contact angle on a glass slide at about 34.4° or less (e.g., about 34° or less) have % water absorption at 2 hours of about 15% or less. It was surprising and unexpected that all waxes and wax blends with a kinematic viscosity @ 100° C. of ≤about 13.1 mm²/s and/or with a contact angle on a glass slide of ≤34.4° provide coating/sizing wax compositions with suitable water repellency performance in OSB applications. That is, all waxes that met the characteristics outlined above are suitable for use as a sizing agent in OSB applications, irrespective of whether the wax was comprised of paraffin wax, slack wax, bright stock slack was, asphalt, triglyceride based wax, other bio-based wax, or combinations thereof.

Method of Measuring the Contact Angle of Wax on Glass. All measurements for contact angle of wax were performed on a Theta Optical Tensiometer (using OneAttension software) manufactured by Biolin Scientific. Measurements were performed by placing a drop of molten wax, using a 1 mL Hamilton syringe wrapped in a heating element and connected to a temperature controller that maintained the wax at 2° C. above the respective wax melt point (0.01° C. temperature stability), on a standard glass slide substrate kept flat to measure the static contact angle. The contact angle measurement software was calibrated using a calibration ball as described in the OneAttension software procedures. The glass slide was kept in a temperature-controlled chamber at the same temperature as the molten wax being placed on it through the heated glass syringe. The glass slide substrate was, washed with water and acetone, cleaned with Kimwipe and compressed air was blown on the glass slide to ensure that it was completely free or any residues and particles. Static contact angle was measured using the "Sessile drop" method on OneAttension Theta software. Briefly, the substrate was placed in the middle of the stage below the needle. The sample stage was only moved perpendicular to the camera's view with the sample state controls, such that the left end of the test substrate (from camera view) was moved directly below the needle—leave a space between the very edge of the substrate and the area below the needle. The substrate was flat and the height of the sample stage was adjusted such that substrate is on screen. The syringe height was adjusted so that the needle tip minimally extended into the screen view. The test liquid and substrate were allowed to stabilize to the desired temperatures. A baseline was adjusted to match the flat substrate line. The "place drop"

option in the software was utilized to place a fixed small volume (about 4 microliter) drop gently (dispenser speed 10 mm/s) on the substrate. As the volume of the growing drop approached the volume to be dispensed, it was ensured that vibrations were at an absolute minimum. If the dispensed drop was very uneven, the data was discarded and a new drop was placed or a new cleaned substrate used.

The placed drop was analyzed for its contact angle using the "analysis" tab in the software. The software takes a set of frames of images after the drop is placed on substrate.

waxes however have ideal melting points for jar candles, with reasonable wax consumption upon burning, and relatively low sooting. Please note that Tables 4-6 list the dropping point for all waxes for consistency. 600N slack waxes and the resultant blends cannot be measure by melting point, thus dropping point is used as an equivalent test. Comparative testing indicates only a marginal difference between the two determined values.

TABLE 4

Reference and Parent Waxes

|  | Oil in Wax [%] | Dropping Point Point [° C.] | % n-paraffins | Soot [ug Soot/g wax] | Wax Consumption [g/hr] | Oil Bleed | Melt Pool Depth [mm] | Appearance | Top Shrinkage | Flame Height Melt Pool Depth |
|---|---|---|---|---|---|---|---|---|---|---|
| Reference 1 | 1 | 53 | 58 | 63 | 3.7 | Yes - droplets | 10.5 | Not Smooth | None | 1.4 |
| Reference 2 | 4 | 56 | 42 | 77 | 3.9 | Yes - droplets | 9.0 | Not Smooth | None | 1.7 |
| Foots Oil | 40 | 42 | 30-40 | 4400 | 3.0 | No | 50.0 | Not Smooth | None | 0.3 |
| Parent 1 | 15 | 67 | 38 | 262 | 2.5 | No | 0.0 | Smooth with frost | Cracks | unable to form melt pool |
| Parent 2 | 6 | 67 | 28 | 214 | 3.0 | No | 0.0 | Smooth with frost | Cracks | unable to form melt pool |

Since the static contact angles reach equilibrium on the substrate after initial placement of the drop, the contact angle measured and reported here was the contact angle of the wax on the glass slide at 75 seconds after the initial placement of the drop on the substrate. All measurements were taken at 2° C. above the melt point of the wax. As defined here, this is the temperature at which the wax turns from solid to complete liquid on the glass substrate.

Another advantage of the compositions and methods described herein is the flexibility and availability of wax product streams that can be used to make wax compositions as described herein, which can thereby reduce the cost of the wax product.

The components of the wax formulation can be combined through various different processes. By way of non-limiting example, in the case of combining multiple wax streams, the coating composition can be formed by melting and homogenizing the waxes by stirring and heating them in a vessel at a temperature about 15° C. above the melting temperature of the higher melting wax.

As an example, several wax samples, 1 through 15 were made through blending of individual petroleum based wax components, F-T waxes and base oils in some case to provide samples that spanned a wide range of compositional space (FIG. 2.).

Wax compositions are typically measured through GC, which provides the amount of n-paraffins and the amount of non n-paraffins (primarily isoparaffins and cycloparaffins) in the wax for different carbon numbers (modified method for wax based on ASTM D5442).

Examination of Candle Jar Wax Formulations and Candle Jar Production. Table 4 lists the physical properties, burning performance and candle appearance attributes of Reference Slack Waxes currently available and the parent waxes (Foots Oil and Parent Waxes 1 and 2) used in the wax formulations examined below. Although the Reference Waxes on their own are not smooth and demonstrate oil bleed; candle jar manufacturers often blend additional waxes to obtain a smooth finish where oil bleed is minimized. The reference Individually, the parent waxes are not ideal jar candle waxes. Foots oil demonstrates good appearance properties, being both smooth and having no oil bleed, despite a very high oil content (candle customers generally expect good candle waxes to have less than 20% oil. It is in the burning evaluation that foots oil fails to succeed where most notably a significant amount of soot upon burning is generated (e.g., foots oil with as much as 40% oil has excessive sooting upon burning). Additionally, the low dropping point causes nearly the entirety of a 5 oz. candle to liquefy upon burning, which is not a desirable burning behavior. Parent waxes 1 and 2 are not ideal for smooth candles based solely on appearance. The exterior surface, although smooth, is found to have a significant degree of frosting where the wax has dis-adhered from the glass jar. In addition, the wax cracks and partially tunnels on the top of the candle. Although Parent Waxes 1 and 2 appear to have reasonably low sooting this is attributed to the high dropping point that effectively impedes the waxes ability to form a complete melt pool. As a result these parent waxes demonstrate tunneling upon burning.

Foots Oil (a high oil-in-wax soft wax product) were combined with either Parent Wax 1 or 2 (comprising a high melt 600N slack wax) such that the majority of the formulation is composed of foots oil. The resulting wax products yielded smooth finished candle waxes demonstrating superior oil bleed control and excellent burning characteristics. In particular, 70 to 80% foots oil was blended with 20 to 30% parent wax 1 or 2. The wax formulations surprisingly and unexpectedly resulted in the desired melting point/dropping point targets of about 50° C. and about 57° C., respectively.

Table 5 highlights the physical properties and candle appearance attributes of wax blends comprising 80% foots oil and 20% of a specified paraffinic wax [Wax 'X']. The appearance properties of the wax formulations that utilizes Parent Wax 1 and 2 in combination with foots oil are also shown in Table 2. As is shown in Table 2, Fully Refined Wax 1 and Slack Wax 1 were observed to yield oil bleed with varying severities. Additionally, the use of 20% Semi Refined Wax resulted in a non-smooth candle finish. Thus, these three wax blends are unable to meet the required appearance targets. Furthermore at the specified ratio, the dropping point is too low for a jar candle application. The percent n-paraffin content of Wax 'X' may negatively influence these properties whereby high n-paraffin content leads to either oil bleed or a non-smooth finish. Several waxes shown in Table 2 [Slack Wax 2 and Petrolatum] meet the requirements for smooth finish with no oil bleed, including the candle jar wax formulations of the present disclosure. Additionally, these waxes at the specified ratio approximately meet the desired low end melting point/dropping point target of 50° C.

hour burn cycle consequently causing the candle wax to tunnel during burning. The only exception is Slack Wax 2 at 30% in which the melt pool forms, however the wax blend had significantly more soot generated versus the wax formulation of the present disclosure.

Table 6. Burning Properties for wax formulations containing 70% or 80% foots oil.

TABLE 6

Burning Properties for wax formulations containing 70% or 80% foots oil.

| | Dropping Point [° C.] | Soot [μg Soot/g wax] | Wax Consumption [g/hr] | Melt Pool Depth [mm] | Flame height: Melt Pool Depth | Burning Comments |
|---|---|---|---|---|---|---|
| 20% Parent 1 | 52 | 402 | 2.1 | 8.3 | 0.9 | |
| 20% Parent 2 | 51 | 466 | 2.2 | 8 | 0.8 | |
| 20% Petrolatum | 56 | 423 | 1.8 | 0 | | Did not form Candle did not form melt pool completely, wax tunnels when burned |
| 20% Slack Was 2 | 49 | 518 | 1.92 | 0 | | Did not form Candle did not form melt pool completely, wax tunnels when burned |
| 30% Parent 1 | 56 | 438 | 2.6 | 10 | 1.2 | |
| 30% Parent 2 | 57 | 433 | 2.4 | 12 | 1.2 | |
| 30% Petrolatum | 64 | 922 | 1.6 | 0 | | Did not form Candle did not form melt pool completely, wax tunnels when burned |
| 30% Slack Wax 2 | 52 | 994 | 2.3 | 5 | 1.4 | |

TABLE 5

Appearance properties for wax formulations containing 80% Foots oils.

| | % n-paraffins in Wax 'X' | Dropping Point of blend [° C.] | Oil Bleed [mg] | Appearance | Optimum Range |
|---|---|---|---|---|---|
| Parent 1 | 38 | 52 | No | Smooth | >10% |
| Parent 2 | 28 | 51 | No | Smooth | >10% |
| Fully Refined Wax 1 | 80 | 44 | 1710 | Not Smooth | TBD |
| Fully Refined Wax 2 | 47 | 53 | TBD | Smooth | TBD |
| Petrolatum | 10 | 56 | No | Smooth but dark colour | TBD |
| Semi-Refined Wax | 66 | 46 | TBD | Not Smooth | TBD |
| Slack Wax 1 | 77 | 44 | 383 | Not Smooth | TBD |
| Slack Wax 2 | 26 | 49 | No | Smooth | TBD |

Table 6 further demonstrates the burning characteristics of these wax blends at both 20% and 30% of Wax 'X'. At both 20% and 30% Wax 'X', Parent Waxes 1 and 2 demonstrate the least amount of sooting upon burning compared to Slack Wax 2 and Petrolatum. Increasing Wax 'X' from 20% to 30% increases the amount of soot when Slack Wax 2 and Petrolatum are combined with foots oil, while the amount of soot generated does not appreciably change when increasing the concentration of Parent Wax 1 or 2 from 20% to 30%. Although the wax consumption was generally found to be lower for wax blends using Slack Wax 2 and Petrolatum (versus Parent Waxes 1 and 2) the candle wax did not burn correctly; that is, the melt pool did not fully form in the 4 hour burn cycle consequently causing the candle wax to tunnel during burning.

Parent Waxes 1 and 2 were found to have lower wax consumption versus the Reference Waxes (waxes utilizing in current candle jar wax formulation). This is advantageous for the customer whereby a specific burn time is a requirement for successful candle wax selection. Furthermore the flame height to melt pool ratio is approximately the desired target value of 1. Although the degree of sooting is greater than the Reference Waxes, the proposed wax blends have very low sooting behavior in comparison to many waxes currently available for candle applications and it is expected that the soot performance for this disclosure will be competitive in the marketplace.

REFERENCES

The following references are incorporated herein by reference in their entirety for all purposes.

1) Hudson C. W., Hennessey, A. P., "Wax composition for construction board application", U.S. Pat. No. 6,830,614, 2004
2) Hsu O. H. H., Bender H. S., "Water repellant efficacy of wax used in hardboard", Ind. Eng. Chem. Res., 1988, 27, 1296-1300
3) Carlson B. S., Palardy R. D., "Steam pre-heating in oriented strand board production", WO1999024233
4) Theberge, J. P., Liles, W. T., "Wax blends for use with engineered composite wood", U.S. Pat. No. 8,071,209
5) Wantling S. J., "Triglyceride compositions useful for preparing composite panels and applications thereof", U.S. Pat. No. 8,076,006
6) Wantling S. J., Wren H. C., Holder J. L., "Triglyceride compositions useful for preparing composite panels and applications thereof", U.S. Pat. No. 8,343,634
7) Sleeter R., "Material for enhancing water tolerance of composite boards by use of a melted triglyceride", U.S. Pat. No. 6,277,310
8) Sleeter R. T., "Material for enhancing water tolerance of composite boards", U.S. Pat. No. 6,001,286
9) Buchholz T., "Use of oily soft waxes as hydrophobizing agents in timer products, timber products thus produced and processes for introducing soft waxes into timber products", U.S. Pat. No. 8,476,345
10) Buchholz T., Scheidat H. J., "Nanoparticulate wax dispersions, process for preparing them and method for hydrophobizing materials using them", U.S. Pat. No. 8,652,633
11) Buchholz T., Meyer G., Prusmann M., "Wood composition containing olefins, use of olefins for rendering raw wood materials water repellant, and methods for the production of wood materials", U.S. Pat. No. 8,231,763
12) Winterowd J. G., Bjorkman T. E., Parker E. M., "Wood composite with water repelling agent", U.S. Pat. No. 8,748,516
13) Lindsay A. R., Ciruna J. A., "Method for manufacturing composite board using high oil content wax and the composite board made using high oil content wax", U.S. Pat. No. 6,183,849

PCT/EP Clauses:
1. A wax composition comprising at least one of: a kinematic viscosity measured at 100° C. of ≤13.1 mm²/s, and a contact angle on glass of ≤34.4°.
2. The wax composition of clause 1, wherein the composition has a flash point of at least 425° F.
3. The wax composition of clause 1, comprising a kinematic viscosity measured at 100° C. of ≤13.1 mm²/s, and a contact angle on glass of ≤34.4°.
4. The wax composition of any of clauses 1-3, wherein the kinematic viscosity is ≤10 mm²/s.
5. The wax composition of any of clauses 1-4, wherein the kinematic viscosity is ≤7.9 mm²/s.
6. The wax composition of any of clauses 1-5, wherein the kinematic viscosity is ≤6.3 mm²/s.
7. The wax composition of any of clauses 1-6, wherein the contact angle on glass is ≤34°.
8. The wax composition of any of clauses 1-7, wherein the contact angle on glass is ≤30°.
9. A wax coated article comprising a composite cellulosic material having a surface including a wax coating, wherein the wax coating comprises a wax according to any of clauses 1-8.
10. The article of clause 9, wherein the wax coating is from 0.1% by weight to 15% by weight of the cellulosic material or article.
11. The article of clause 9 or 10, wherein the wax coating is 0.1% by weight to 5% by weight of the cellulosic material or article.
12. The article of any of clauses 9-11, wherein the composite cellulosic material is a composite wood material, oriented strand board (OSB), particleboard, medium density fiberboard, construction board or combination thereof.
13. The article of any of clauses 9-12, wherein the composite cellulosic material is oriented strand board (OSB).
14. The article of clause 9, wherein the coating completely or partially covers the surface of the cellulosic material.
15. The article of clause 9, wherein the article comprises a wax coating of from 1% weight to 90% by weight of the cellulosic material.
16. The article of clause 10, wherein the article has a water absorption of less than 20%.
17. A method of manufacturing a wax coated cellulosic material comprising the steps of providing a cellulosic material, and applying a wax composition as described herein.
18. A candle wax composition comprising a 150N foots oil and 600N slack wax.
19. The composition of clause 18, wherein the composition comprises 70% to 80% 150N foots oil.
20. The composition of clause 18 or 19, wherein the composition comprises 20 to 30% 600N slack wax.
21. The composition of clause 18, wherein the wax has substantially no oil bleed.
22. A candle jar comprising the candle wax composition of clause 18.
23. The candle jar of clause 22, wherein the candle jar wax composition has at least one of the following burning properties: a dropping point in a range of 50° C. to 58° C., a soot production in a range of 400 to 450 μg Soot/g wax, a melt pool depth of 6 to 14 mm (e.g., 8 mm to 12 mm), a flame height to melt pool ratio in a range of 0.8 to 1.2 (e.g., 0.9 to 1.1), and wax consumption per hour is 1.8 to 3 g/hour (e.g., 2 to 2.7 g/hour).
24. The candle jar of clause 23, wherein the melt pool depth and the flame height to melt pool ratio are after a 4 hour burn cycle.

While preferred embodiments of the disclosure have been shown and described herein, it will be understood that such embodiments are provided by way of example only. Numerous variations, changes and substitutions will occur to those skilled in the art without departing from the spirit of the disclosure. Accordingly, it is intended that the appended claims cover all such variations as fall within the spirit and scope of the disclosure.

The contents of all references, patents, pending patent applications and published patents, cited throughout this application are hereby expressly incorporated by reference.

Those skilled in the art will recognize, or be able to ascertain using no more than routine experimentation, many equivalents to the specific embodiments of the disclosure described herein. Such equivalents are intended to be encompassed by the following claims. It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

The invention claimed is:
1. A wax coated article comprising a composite cellulosic material having a surface including a wax coating, wherein the wax coating comprises a wax composition comprising a paraffin wax, the wax composition having a flash point of at least 425° F., a kinematic viscosity measured at 100° C. of ≤13.1 mm²/s, and a contact angle on glass of ≤34.4°.
2. The wax coated article of claim 1, wherein the wax coating is 0.1% by weight to 15% by weight of the composite cellulosic material or wax coated article.
3. The wax coated article of claim 2, wherein the wax coating is 0.1% by weight to 5% by weight of the composite cellulosic material or wax coated article.

4. The wax coated article of claim 3, wherein the wax coating is 0.1% by weight to 1% by weight of the composite cellulosic material or wax coated article.

5. The wax coated article of claim 1, wherein the composite cellulosic material is a composite wood material, oriented strand board (OSB), particleboard, medium density fiberboard, construction board or combination thereof.

6. The wax coated article of claim 1, wherein the composite cellulosic material is oriented strand board (OSB).

7. The wax coated article of claim 1, wherein the wax coating completely or partially covers the surface of the composite cellulosic material.

8. The wax coated article of claim 1, wherein the wax coated article comprises a wax coating of from 1% weight to 90% by weight of the composite cellulosic material.

9. The wax coated article of claim 1, wherein the wax coated article has a water absorption of less than 20%.

10. The wax coated article of claim 1, wherein the wax coated article has a water absorption of less than 15%.

11. The wax coated article of claim 1, wherein the wax coated article: has a water absorption of less than 13%.

12. The wax coated article of claim 1, comprising a kinematic viscosity measured at 100° C. of ≤11 mm$^2$/s, and a contact angle on glass of ≤34.4°.

13. The wax coated article of claim 1, wherein the kinematic viscosity is ≤10 mm$^2$/s.

14. The wax coated article of claim 13, wherein the kinematic viscosity is ≤7.9 mm$^2$/s.

15. The wax coated article of claim 1, herein the kinematic viscosity is from 6.5 mm$^2$/s to 13 mm$^2$/s.

16. The wax coated article of claim 1, wherein the contact angle on glass is ≤34°.

17. The wax coated article of claim 16, wherein the contact angle on glass is ≤32°.

18. The wax coated article of claim 17, wherein the contact angle on glass is ≤30°.

19. A method of manufacturing a wax coated article comprising the steps of providing a cellulosic material, and applying a wax composition comprising a paraffin wax to the cellulosic material, the wax composition having a flash point of at least 425° F., a kinematic viscosity measured at 100° C. of ≤13.1 mm$^2$/s, and a contact angle on glass of ≤34.4°.

\* \* \* \* \*